(12) United States Patent
Semba et al.

(10) Patent No.: US 6,411,304 B1
(45) Date of Patent: Jun. 25, 2002

(54) COLOR DATA GAMUT CONVERSION USING THREE COLOR LIGHTNESS RANGES IN AN APPARATUS, METHOD, AND COMPUTER-READABLE RECORDING MEDIUM WITH A PROGRAM MAKING A COMPUTER EXECUTE THE METHOD RECORDED THEREIN

(75) Inventors: Satoshi Semba; Masayoshi Shimizu; Shoji Suzuki, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/430,188

(22) Filed: Oct. 29, 1999

(30) Foreign Application Priority Data

Jul. 1, 1999 (JP) .......................................... 11-188227

(51) Int. Cl.$^7$ ................................................ G09G 5/02
(52) U.S. Cl. ....................... 345/590; 345/589; 345/591; 345/604
(58) Field of Search .......................... 382/167; 358/1.9; 345/431, 150, 581, 589, 590, 596, 600, 601, 604, 591

(56) References Cited

U.S. PATENT DOCUMENTS

| 5,416,890 A | * | 5/1995 | Beretta | ........................ 345/590 |
| 6,130,675 A | * | 10/2000 | Murai et al. | ................. 345/600 |
| 6,172,681 B1 | * | 1/2001 | Ueda | ........................... 345/589 |
| 6,275,607 B1 | * | 8/2001 | Shimizu et al. | ............. 382/167 |
| 6,297,826 B1 | * | 10/2001 | Semba et al. | ................ 345/589 |

FOREIGN PATENT DOCUMENTS

| JP | 60-105376 | 6/1985 |
| JP | 10-008865 | 1/1998 |

OTHER PUBLICATIONS

P. Laihanen, "Colour Reproduction Theory Based on The Principles of Colour Science", University of Technology, Helsinki, Finland, pp. 1–36.

* cited by examiner

*Primary Examiner*—Jeffery Brier
*Assistant Examiner*—Anthony J. Blackman
(74) *Attorney, Agent, or Firm*—Staas & Halsey, LLP

(57) ABSTRACT

A third color data which is at the same hue angle as that of first color data and also has the highest chroma within a color gamut of a printer and a fourth color data for an achromatic color having the same lightness as that of the third color data are acquired. First color data are converted to second color data based on the target color data located at any of a first line linking the fourth color data to color data corresponding to the black color in the color gamut of the printer, on a second line linking the fourth color data to color data corresponding to the white color in the color gamut of the printer, or on a third line linking the fourth color data to the third color data.

19 Claims, 14 Drawing Sheets

COLOR DATA GAMUT CONVERSION USING THREE COLOR LIGHTNESS RANGES IN AN APPARATUS, METHOD, AND COMPUTER-READABLE RECORDING MEDIUM WITH A PROGRAM MAKING A COMPUTER EXECUTE THE METHOD RECORDED THEREIN

FIELD OF THE INVENTION

The present invention relates to a color data conversion apparatus for converting first color data included in a first color gamut of color image equipment such as a CRT, according to prespecified target color data within a second color gamut of another color image equipment such as a printer, to second color data within the second color gamut as well as to a color data conversion method and a recording medium for the same. More particularly, this invention relates to a color data conversion apparatus enabling efficient performance of color data conversion without increase in its lightness when an image fetched through a scanner is displayed on a CRT or a result of an image printed by a printer is reproduced on a CRT as well as to a color data conversion method and a recording medium for the same.

BACKGROUND OF THE INVENTION

Conventionally, color image equipment such as a printer and a CRT has, in many cases, a different color gamut. Therefore, there may arise a case where a color capable of being displayed on a CRT can not be printed. Disclosed in Japanese Patent Laid-Open Publication No. SHO 60-105376 (Conventional technology 1) is a color image output device for converting color data included in the first color gamut dependent on first color input/output equipment toward an achromatic color having the same lightness as that of the first color data tobe converted to second color data included in the second color gamut dependent on second color input/output equipment.

FIGS. 13A and 13B explain the concepts of conventional color data conversion for converting color data included in a color gamut of a CRT to color data included in a color gamut of a printer on a L*a*b* space. An area 301 indicated by a broken line in these figures shows a color gamut of a CRT, and an area 302 indicated by a solid line shows a color gamut of a printer In this L*a*b* space, lightness becomes higher as an L* value is larger, chroma becomes higher as values of a* and b* become larger. Positive area of b* is mainly a yellow gamut, while negative area of b* is mainly a blue gamut.

As shown in FIG. 13A, color data 303, 306, 309, and 312 displayable on a CRT are outside of the printer color gamut, therefore the color data 303, 306, 309, and 312 cannot be printed by a printer unless they are converted to data for a printer.

Therefore, in accordance with the conventional technology 1, when a color of the color data 303 is to be converted to a color within the printer color gamut 302, by marking color data 304 for an achromatic color having the same lightness as that of the color data 303 and converting the color of the color data 303 toward the color data 304, color data 305 corresponding to the color data 303 is acquired.

Also, when a color of the color data 306 for blue with high chroma is to be converted to a color within the printer color gamut 302, by marking color data 307 for an achromatic color having the same lightness as that of the color data 306 and converting the color of the color data 306 toward the color data 307, color data 308 corresponding to the color data 306 is acquired. Similarly, the color data 309 is converted toward color data 310 to acquire color data 311, and the color data 312 is converted toward color data 313 to acquire color data 314.

As described above, in the conventional technology 1, when the color data 303, 306, 309, and 312 are to be printed, the color data 305, 308, 311, and 314 are used in place of the color data described above.

However, the conventional technology 1 has a problem (described as "problem 1" hereinafter) that when the color data 303 for yellow with high chroma and the color data 306 for blue with high chroma are converted, the chroma tends to degrade more. For example, when an image of a banana or a lemon photographed by a digital camera or an image of bright-colored printed matter inputted with a color scanner is printed, chroma of yellow is largely lost, thus the image becomes unnatural.

There is another problem (described as "problem 2" hereinafter) that even if the color data 315 and 317 shown in FIG. 13A are converted by using the conventional technology 1, the converted color data may be color data 316 and 318 which are outside of the printer color gamut 302.

Therefore, disclosed in a paper "Colour Reproduction Theory based on the Principles of Colour Science" written by Laihanen, P. (Conventional technology 2) is a technology in which all of the first color data included in the first color gamut dependent on the first color input/output equipment is converted toward an achromatic color having an intermediate lightness value between the highest lightness value and the lowest lightness value of the second color gamut to be converted to the second color data included in the second color gamut dependent on the second color input/output equipment.

FIG. 13B explains the concepts of color data conversion based on the conventional technology 2. As shown in this figure, in the conventional technology 2, color data 326 and 328 which are outside of the printer color gamut 302 are converted toward color data 322 for an achromatic color having an intermediate lightness value between the highest lightness value and the lowest lightness value of the printer color gamut 302, and color data 327 and 329 are respectively acquired.

Namely, in the conventional technology 2, the color data 322 is insured to always exist within the printer color gamut 302. Therefore any color can be printed by a printer, which is different from the conventional technology 1. Thus the problem 2 is solved. In addition, with the conventional technology 2, high-chroma yellow color data 321 is converted to color data 323, and high-chroma blue color data 324 is converted to color data 325, therefore decrease in chroma is reduced as compared to that of the conventional technology 1. Thus the problem 1 is solved.

When the conventional technology 2 is used, however, there comes up an extremely significant problem (described as "problem 3" hereinafter) that each relation of both lightness values and chroma values between two color data is concurrently reversed respectively, which is called, reversion of gray scale. Especially, the reversion of gray scale described above becomes sever when a relation between a lightness value A of color data before conversion, a lightness value B of the color data 332 which is at the same hue angle as that of the color data and also has the highest chroma included in the printer color gamut 302, and a lightness value C of the color data 322 for an achromatic color having the intermediate lightness value is A>B>C or A<B<C.

For example, referring to the color data 330 and the color data 321 shown in FIG. 13B, original lightness and chroma values of the color data 321 are higher than the lightness value and chroma value of the color data 330. However, if the color data 331 to which the color data 330 is converted and the color data 323 to which the color data 321 is converted are compared, then it can be understood that the lightness value and chroma value of the color data 331 are higher than the lightness value and chroma value of the color data 323. Thus, a reversion of gray scale has occurred.

In the Japanese Patent Laid-Open Publication No. HEI 10-8865 applied on Jan. 20, 1998 by the applicant of the present application (conventional technology 3) a color data conversion method has been disclosed for converting first color data included in the first color gamut dependent on the first color input/output equipment toward third color data locating on a line linking color data which is at the same hue angle as that of the first color data and also has the highest chroma of the colors included in the second color gamut dependent on the second color input/output equipment to color data for an achromatic color which is at the same hue angle as that of the color data to compute second color data included in the second color gamut.

FIGS. 14A and 14B explain the concepts of color data conversion based on the conventional technology 3 and the problems therein. As shown in FIG. 14A, in the conventional technology 3, color data 360 which is at the same hue angle as that of color data 343, 349, and 352 within the CRT color gamut 301 and also has the highest chroma of the printer color gamut 302 is linked with a color data 361 for an achromatic color having the same lightness as that of the color data 360 with a line (corresponding to a dashed line 341 in FIG. 14A). Then, the color data 343, 349, and 352 as targets for conversion are converted toward color data 344, 350, and 353 located on this line, and color data after conversion 345, 351, and 354 are acquired.

Namely, in the method based on the conventional technology 3, the color data 343 is converted to color data which has higher chroma when the chroma value of the color data 343 before conversion is higher and also has higher chroma when the lightness value of the color data 343 is closer to the lightness value of the color data 360.

Similarly, color data 362 which is at the same hue angle as that of color data 346 and 355 and also has the highest chroma of the printer color gamut 302 is linked with a color data 363 for an achromatic color having the same lightness as that of the color data 362 with a line (corresponding to a dashed line 342 in FIG. 14A). Then, the color data 346 and 355 are converted toward color data 347 and 356 located on the line, and color data after conversion 348 and 357 are acquired.

As described above, with the conventional technology 3, color data with higher chroma is converted toward color data with higher chroma on the line, therefore the problem (problem 1) in the conventional technology 1 and conventional technology 2 that chroma in color data decreases can be resolved, and also the problem (problem 2) that there exists color data incapable of being converted can be resolved. Furthermore, the problem (problem 3) that lightness values and chroma values of two color data are reversed can be resolved, so that extremely favorable color reproduction can be performed when a color displayed on a CRT is to be printed by a printer.

Even if the conventional technology 3 is used, however, when a color image fetched with a color scanner is reproduced on a CRT display or when a result of an image printed by a printer is reproduced on a CRT display, there comes up a problem that the lightness of the color data after the conversion increases.

FIG. 14B explains this new problem when the conventional technology 3 is used. For convenience in description, herein the problem is explained with reference to a L*a* cross section of the L*a*b* space. It is assumed that an area 371 indicated by a broken line in the figure shows a color gamut of a CRT and an area 372 indicated by a solid line shows a color gamut of a color printer in a silver-salt photographic system. An a*-positive area is an area of mainly magenta, and an a*-negative area is an area of mainly green.

In FIG. 14B, a dashed line 374 links a color data 384 which is at the same hue angle as that of a color data 381 and also has the highest chroma of the CRT color gamut 371 with a color data 385 for an achromatic color having the same lightness as that of the color data 384. Further, a dashed line 373 links a color data 386 which is at the same hue angle as that of color data 375 and 378 and also has the highest chroma of the CRT color gamut 371 to color data 387 for an achromatic color having the same lightness as that of the color data 386.

In the conventional technology 3, the color data 375 is converted toward color data 376 on the dashed line 373 calculated so that when a chroma value of the color data 375 is higher, color data will have higher chroma and the color data also will have higher chroma when a lightness value of the color data 375 is closer to the color data 386, and then color data 377 is acquired. The color data 378 is converted to color data 379, and the color data 381 is converted to color data 383.

As described above, with the conventional technology 3, when the color data 375 and 378 are converted to color data 377 and 379, the lightness values of the data largely increase. Therefore, when the color data after the conversion is displayed on a CRT, the colors are changed to bright colors which are completely different from the original color data.

The reason why the lightness value increases is, the CRT color gamut 371 forming color by light emission is substantially different from a shape of the color gamut 372 of a color printer forming color by reflection of illuminating light. More specifically, in the CRT, the lightness value of the color data 386 with the highest chroma in an area of green color is a quite high of around 80 to 90, and as a result, the line 373 indicated by a dashed line locates in a level of high lightness. On the contrary, in the color printer, the lightness value of the color data 388 with the highest chroma in the area of green color is a comparatively low of around 40 to 50, and as a result, each direction of conversion of the color data 375 and 378 is substantially parallel with an achromatic color axis, so that the lightness value increases largely.

Thus, in the conventional technology 3, there comes up a problem that when an image fetched through a scanner is displayed on a CRT or a result of an image printed by a printer is reproduced on a CRT, the lightness of color data with low lightness located in the green area largely increases. The result is that the color of the image printed by the printer is different from the color displayed on the CRT.

SUMMARY OF THE INVENTION

The present invention has been made for solving the problems described above, and it is an object of the present invention to provide a color data conversion apparatus enabling efficient performance of color data conversion without increase in its lightness when an image fetched through a scanner is displayed on a CRT or a result of an image printed by a printer is reproduced on a CRT as well as to a color data conversion method and a recording medium for the same.

In order to achieve the object described above, the color data conversion apparatus according to the invention acquires third color data which is at the same hue angle as that of first color data within a first color gamut and also has the highest chroma within the second color gamut as well as fourth color data for an achromatic color having the same lightness as that of the third color data by an acquiring unit; and sets target color data on a first line linking the acquired fourth color data to color data corresponding to a black color in the second color gamut, on a second line linking the fourth color data to color data corresponding to a white color in the second color gamut, or on a third line linking the fourth color data to the third color data; and a converting unit converts the first color data to second color data according to the set target color data, so that the first, second, and third lines are insured to be included in the second color gamut, thus the first color data being converted to the second color data without fail. Further, the first color data can be converted to the second color data without fail. In addition, by converting color data toward target color data on the three lines of the first, second, and third lines, it is possible to realize an operation of efficiently converting color data to appropriate one without increase in its lightness when an image fetched through a scanner is displayed on a CRT or a result of an image printed by a printer is reproduced on a CRT.

The color data conversion method according to the invention comprises the steps of acquiring third color data having the highest chroma within the second color gamut as well as fourth color data for an achromatic color having the same lightness as that of the third color data each at the same hue angle as that of first color data within a first color gamut; setting target color data on a first line linking the acquired fourth color data to color data corresponding to a black color in the second color gamut, on a second line linking the fourth color data to color data corresponding to a white color in the second color gamut, or on a third line linking the fourth color data to the third color data; and converting the first color data to the second color data according to the set target color data. Therefore, the first, second, and third lines are insured to be included in the second color gamut, thus the first color data being converted to the second color data without fail. Further, the first color data can be converted to the second color data without fail. In addition, by converting color data toward target color data on the three lines of the first, second, and third lines, it is possible to realize an operation of efficiently converting color data to appropriate one without increase in its lightness when an image fetched through a scanner is displayed on a CRT or a result of an image printed by a printer is reproduced on a CRT.

The recording medium according to the invention makes a computer execute the sequence of the steps of acquiring third color data having the highest chroma within the second color gamut as well as fourth color data for an achromatic color having the same lightness as that of the third color data each at the same hue angle as that of the first color data; and setting target color data on a first line linking the acquired fourth color data to color data corresponding to a black color in the second color gamut, on a second line linking the fourth color data to color data corresponding to a white color in the second color gamut, or on a third line linking the fourth color data to the third color data, and converting the first color data to the second color data according to the set target color data. Therefore, the color data conversion method according to the invention can be realized on a computer.

Other objects and features of this invention will become apparent from the following description with reference to the accompanying drawings.

DESCRIPTION OF THE PREFERRED EMBODIMENTS

Detailed description is made hereinafter for the preferred embodiments of the color data conversion apparatus, color data conversion method, and the computer-readable recording medium with a program making a computer execute the method recorded therein with reference to the attached drawings. Description assumes herein a case where color data within a color gamut of a CRT is converted to color data within a color gamut of a printer.

Figure 1:
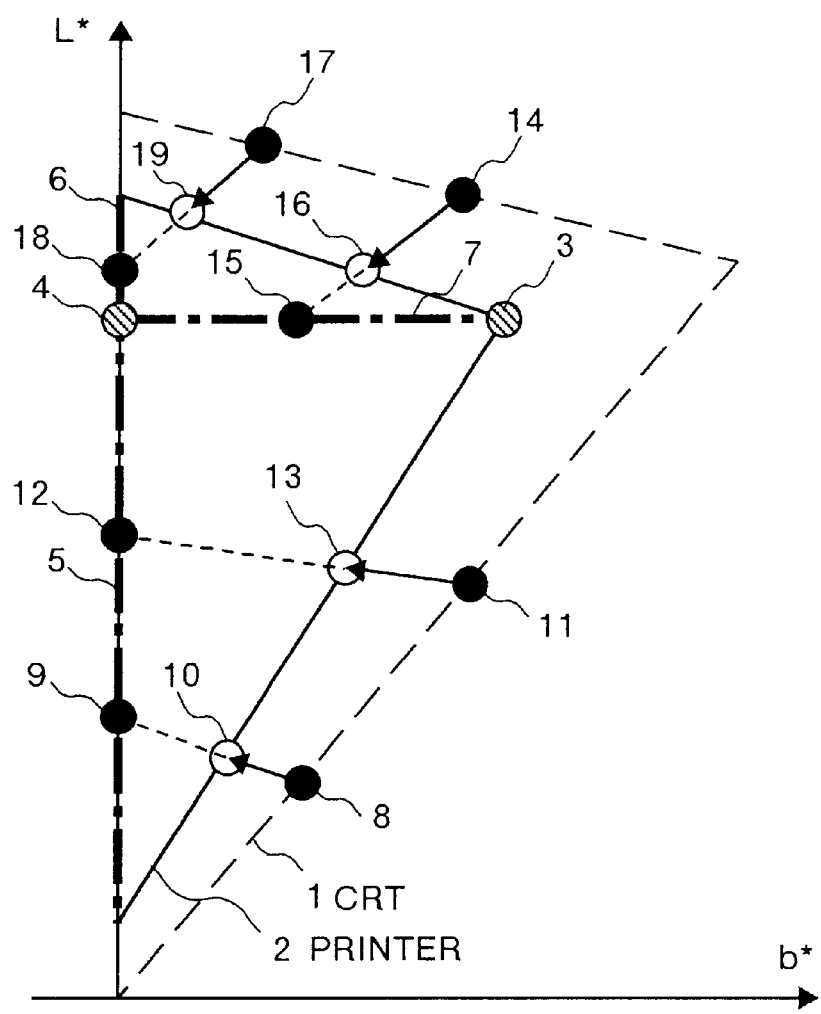
FIG. 1 explains the basic concepts of color data conversion processing by the color data conversion apparatus according to Embodiment 1.

The concepts of color data conversion processing by a color data conversion apparatus according to Embodiment 1 of the present invention are explained with reference to FIG. 1. FIG. 1 explains the basic concepts of color data conversion processing by the color data conversion apparatus according to Embodiment 1.

As shown in FIG. 1, in the color data conversion apparatus according to Embodiment 1, there are provided color data 3 having the highest chroma within a color gamut 2 of a printer, a line 7 linking between the color data 3 and color data 4 for an achromatic color having the same lightness as that of the color data 3, a line 5 on the L* axis linking between the color data 4 and a black color of a printer, and a line 6 on the L* axis linking between the color data 4 and a white color of the printer, and each color data within a color gamut 1 of a CRT is converted toward color data located on any of the lines 5 to 7.

Namely, by converting all the color data within the CRT color gamut 1 toward the color data on the line 7 as the conventional technology 3, lightness of green, namely of color data having low lightness with a* located in a negative area significantly increases when an image fetched through a scanner is displayed on a CRT or when a result of an image printed by a printer is reproduced on a CRT. Thus, in this color data conversion apparatus, each of the color data within the CRT color gamut 1 is converted toward target color data located on any of the lines 5 to 7. As described above, the color data conversion apparatus according to Embodiment 1 does not use only color data on the line 7 as a target for conversion as in the conventional technology 3 but uses the color data on the three lines 5 to 7 as color data for a target for conversion.

In FIG. 1, the color gamut 1 is a color gamut of a color-displayable CRT, while the color gamut 2 is a color gamut of a color-printable printer, and color data 8, 11, 14, and 17 are color data as a target for conversion that is not included in the color gamut 2 of the printer but included only in the color gamut 1 of the CRT. The color data 3 is a color data having the highest chroma included in the printer color gamut 2 at the same hue angle as that of the color data 8, 11, 14, and 17, while the color data 4 is a color data for an achromatic color having the same lightness as that of the color data 3.

The line 5 is a line on the L* axis linking between the color data 4 and a black color of the printer, the line 6 is a line on the L* axis linking between the color data 4 and a white color of the printer. The line 7 is a line linking the color data 4 to the color data 3. The color data 9, 12, 15, and 18 are color data located in each prespecified position on the line 5 to 7 as targets for conversion, and the color data 10, 13, 16, and 19 are color data obtained after the color data 8, 11, 14, and 17 are converted toward the color data 9, 12, 15, and 18 on the lines 5 to 7.

The color data conversion apparatus according to Embodiment 1 converts the color data 8 toward the color data 9 on the line 5 to acquire the color data 10 corresponding to the color data 8 after conversion, and converts the color data 11 toward the color data 12 located on the line 5 to acquire the color data 13 corresponding to the color data 11 after conversion. Furthermore, the apparatus converts the color data 14 toward the color data 15 located on the line 7 to acquire the color data 16 corresponding to the color data 14 after conversion, and converts the color data 17 toward the color data 18 located on the line 6 to acquire the color data 19 corresponding to the color data 17 after conversion.

Figure 3:
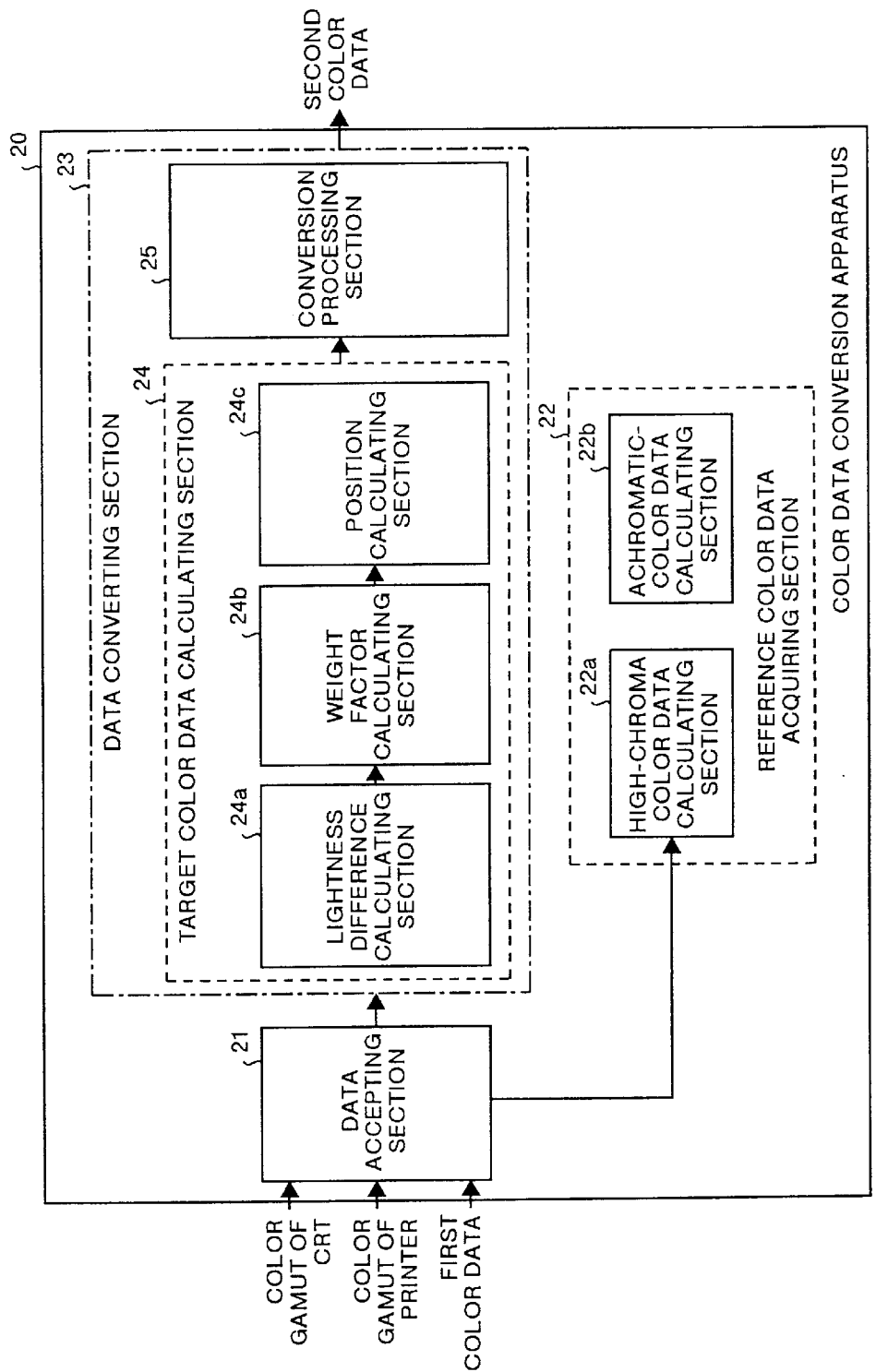
FIG. 3 is a functional block diagram showing configuration of the color data conversion apparatus according to Embodiment 1.

Configuration of the color data conversion apparatus according to Embodiment 1 will be described here. FIG. 3 is a functional block diagram showing configuration of the color data conversion apparatus according to Embodiment 1. As shown in the figure, the color data conversion apparatus 20 comprises a data accepting section 21, a reference color data acquiring section 22, and a data converting section 23.

The data accepting section 21 receives a color gamut of a CRT, a color gamut of a printer, and input color data as a target for conversion (described as "first color data" hereinafter). Then, the data accepting section 21 outputs a color gamut of the printer to the reference color data acquiring section 22 and outputs the color gamut of the CRT, color gamut of the printer and the first color data to the data converting section 23. The data accepting section 21 determines whether the input color data is the first color data as a target for conversion or not, and when it is determined that the data is not the first color data, the processing is terminated without executing conversion processing described later.

The reference color data acquiring section 22 acquires the color data as a reference to be used when the data converting section 23 calculates target color data. This reference color data acquiring section 22 comprises a high-chroma color data calculating section 22a and an achromatic-color data calculating section 22b.

The high-chroma color data calculating section 22a calculates the color data having the highest chroma (described as "third color data" hereinafter) within the printer color gamut as the color data 3 shown in FIG. 1. On the other hand, the achromatic-color data calculating section 22b calculates the color data for an achromatic color (described as "fourth color data" hereinafter) having the same lightness as that of the third color data like the color data 4 shown in FIG. 1.

The data converting section 23 converts the first color data within the CRT color gamut to color data within the printer color gamut after conversion (described as "second color data" hereinafter). This conversion is performed based on target color data located on any of a first line (line 5 in FIG. 1) linking the fourth color data and color gamut corresponding to the black color of the printer obtained from the reference color data acquiring section 22, a second line (line 6 in FIG. 1) linking the fourth color data and color gamut corresponding to the white color of the printer, or a third line (line 7 in FIG. 1) linking the fourth color data and the third color data. The data converting section 23 comprises a target color data calculating section 24 and a conversion processing section 25.

The target color data calculating section 24 calculates a position of target color data which is a target for conversion of the first color data located on the first line, second line, or on the third line. This target color data calculating section 24 comprises a lightness difference calculating section 24a, a weight factor calculating section 24b, and a position calculating section 24c.

The lightness difference calculating section 24a calculates a fourth lightness difference derived from a difference between a lightness value of the first color data and the lightness value of the third color data. The weight factor calculating section 24b calculates a chroma proportion between a chroma value of the first color data and a chroma value of color data having the highest chroma in the CRT color gamut (described as "fifth color data" hereinafter).

When the fourth lightness difference d is smaller than a chroma-importance constant c, the weight factor calculating section 24b calculates a weight factor from an equation as follows:

Weight factor=Chroma proportion×(Chroma-importance constant $c$−Fourth lightness difference $d$)/Chroma-importance constant $c$ When the calculated fourth lightness difference d is larger than the Chroma-importance constant c, the weight factor calculating section 24b calculates a weight factor from another equation as follows:

Weight factor=(Fourth lightness difference $d$−Chroma-importance constant $c$)/Chroma-importance constant $c$ Incidentally, when the weight factor is larger than 1, then the weight factor is taken as 1.

The chroma-importance constant c shown in the above mentioned equation is a constant for determining the importance of retention between predetermined chroma value and lightness value used when the first color data is converted to the second color data. A constant value is used at any time when second color data is to be calculated from all of first color data.

The chroma-importance constant c has a value from 1 to 100. When deriving the second color data from first color data conversion is executed such that importance is put on retention of a lightness value when the value of this constant is less than 50. Importance is put on retention of a chroma value when the value of this constant is larger than 50. Importance is equally put on both the lightness and chroma to be retained when the value of this constant is 50. Therefore, a value larger than 50 is set when the operator wants to put the importance on chroma and convert it before color conversion is executed. A value less than 50 is set when the operator wants to put the importance on lightness, and a value of 50 is set and calculation is performed when the operator wants to put the importance equally on both the lightness and chroma to convert both of them.

Figure 2:
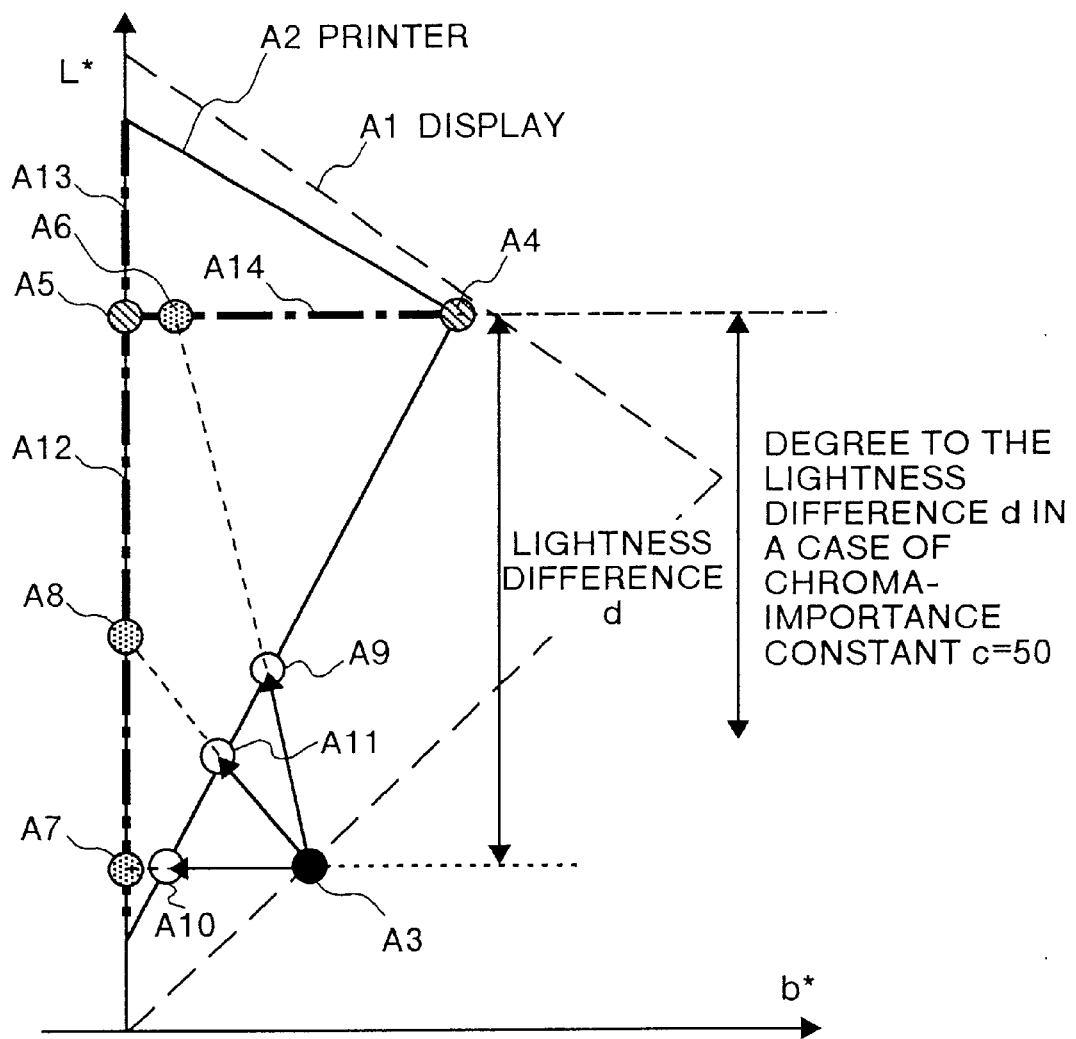
FIG. 2 explains a difference among second color data when a chroma-importance constant is 70, 50, and 30.

As an example, each difference of second color data is shown in each case where target color data for first color data is derived from calculation of a chroma proportion and a weight factor by the above mentioned equation using each of values 70, 50, and 30 as a chroma-importance constant. FIG. 2 explains each difference among second color data when the chroma-importance constant is 70, 50, and 30. Herein, for convenience in description, it is assumed that an image displayed on a display is printed by a printer, and also that a L*b* cross-sectional view is used.

Designated at the reference numeral A1 in the figure is a color gamut of a display, at A2 a color gamut of a printer, at A3 first color data, at A4 third color data, and at A5 fourth color data respectively. The reference numeral A6 in this figure indicates target color data for the first color data A3 when the chroma-importance constant c is 70, and A9 indicates second color data derived by means of compression of the first color data toward the target color data.

In this case, since the chroma-importance constant c is 70 which is large, target color data is calculated to be on a third line A14. Thus, conversion is performed in such a manner that the importance is put on chroma such that the second color data A9 has not much change in its chroma value as compared to that of the first color data A3 before compression but has significant change in its lightness value instead.

The reference numeral A7 in the figure indicates target color data for the first color data A3 when the chroma-importance constant c is 30. The reference numeral A10 indicates second color data derived by means of compression of the first color data toward the target color data. In this case, since the chroma-importance constant c is 30 which is small, the target color data is calculated to be on a first line A12 and also on a position close to the black color of the printer. The second color data A10 is therefore obtained based on conversion in the manner that the importance is put on lightness, such that the color data A10 has not much change in its lightness value as compared to that of the first color data before compression but has significant change in its chroma value instead.

The reference numeral A8 in the figure indicates target color data for the first color data A3 when the chroma-importance constant c is 50. The reference numeral A11 indicates second color data derived by means of compression of the first color data toward the target color data. In this case, since the chroma-importance constant c is an intermediate value between 70 and 30, the target color data is calculated to be on the first line A12 and also on a position in between the other target color data A6 and A7. The second color data A11 is therefore obtained based on conversion in the manner that the importance is equally put on lightness and chroma, such that the lightness value and chroma value are substantially equally changed as compared to those of the first color data before compression.

As described above, if the target color data is calculated to be on the third line, conversion with more importance being put on chroma is performed, conversely, if the target color data is calculated to be on the first or the second line, conversion with the importance being put on lightness is performed. If the chroma-importance constant c is made larger than 50, the target color data for a larger number of first color data is calculated to be on the third line.

Therefore, when an image displayed on a display is to be converted, by making larger the chroma-importance constant c, the image is converted with more importance being put on its chroma to be printed by a printer. Conversely, by making smaller the chroma-importance constant c, the image displayed on a display is converted with the importance being put on its lightness to be printed by a printer.

However, when the chroma-importance constant c is set to an extremely large value such as 100, inappropriate conversion such that the importance is unusually put on chroma retention is performed. On the other hand, when the chroma-importance constant c is set to an extremely smaller value such as 1, inappropriate conversion such that the importance is unusually put on lightness retention is performed. Therefore, it needs to set a value adjacent to 50 for the chroma-importance constant The position calculating section 24c calculates a position of target color data corresponding to first color data located on three lines. More specifically, when the lightness value of first color data is lower than the lightness value of third color data and the fourth lightness difference d is larger than a chroma-importance constant c, and if the weight factor is 0, then the position computing section 24c determines a position of fourth color data as a position of target color data. On the contrary, if the weight factor is not 0, then the position computing section 24c determines a position on the first line corresponding to the weight factor as a position of the target color data.

Further, when the lightness of first color data is lower than the lightness of third color data and the fourth lightness difference d is smaller than the chroma-importance constant c, and if the weight factor is 0, then the position computing section 24c determines a position of fourth color data as a position of target color data. On the contrary, if the weight factor is not 0, then the position computing section 24c determines a position on the third line corresponding to the weight factor as a position of the target color data.

Furthermore, when the lightness of first color data is higher than the lightness of third color data and the fourth lightness difference d is larger than the chroma-importance constant c, and if the weight factor is 0, then the position computing section 24c determines a position of fourth color data as a position of target color data. On the contrary, if the weight factor is not 0, then the position computing section 24c determines a position on the second line corresponding to the weight factor as a position of the target color data.

When the lightness of first color data is higher than the lightness of third color data and the fourth lightness difference d is smaller than the chroma-importance constant c, and if the weight factor is 0, then the position computing section 24c determines a position of fourth color data as a position of target color data. On the contrary, if the weight factor is not 0, then the position computing section 24c determines a position on the third line corresponding to the weight factor as a position of the target color data.

The conversion processing section 25 determines the color data located at a point of intersection of a fourth line linking the first color data to the target color data and the outermost line of a color gamut of a printer as second color data.

By using the color data conversion apparatus 20 having the configuration as described above, first color data is converted toward target color data on the first, second, or third line, thus second color data being acquired.

Figure 4:
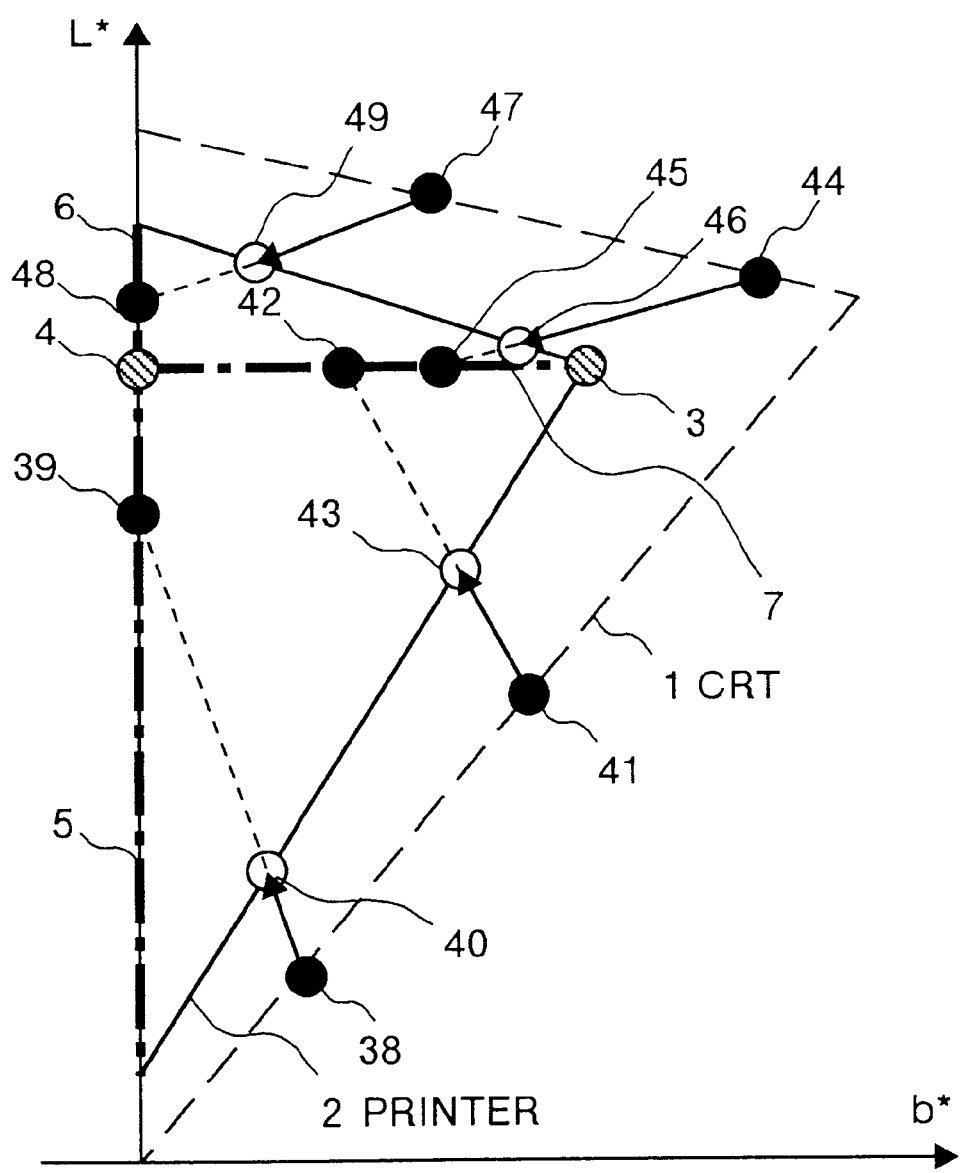
FIG. 4 explains a correlation between three lines used by the target color data calculating section shown in FIG. 3 and first color data.

Next, detailed description is made for a correlation between the three lines used by the target color data calculating section 24 shown in FIG. 3 and first color data. FIG. 4 explains a correlation between the three lines used by the target color data calculating section 24 shown in FIG. 3 and first color data. The same reference numerals are assigned hereinafter to the sections corresponding to those in FIG. 1, and detailed description thereof is omitted herein.

In FIG. 4, color data 38, 41, 44, and 47 are first color data included in the color gamut 1 of a CRT, color data 39 is target color data on a line 5, color data 48 is target color data on a line 6, and color data 42 and 45 are target color data on a line 7.

In the color data conversion apparatus 20, of first color data included in the color gamut 1 of a CRT, color data having lower lightness than that of the third color data is converted toward target color data on the line 5 or 7, and color data having higher lightness than that of the third color data is converted toward the target color data on the line 6 or 7.

More specifically, as each lightness value of the first color data 38 and 41 is smaller than the lightness value of the third color data 3, the color data 38 and 41 are converted toward the target color data on the line 5 or 7. Herein, there is shown a case in which the color data 38 is converted toward the target color data 39 located on the line 5 to acquire second color data 40 corresponding to the color data 38, and also a case in which the color data 41 is converted toward the target color data 42 located on the line 7 to acquire second color data 43 corresponding to the color data 41.

In contrast, as each lightness value of the first color data 44 and 47 is larger than the lightness value of the third color data 3, the color data 44 and 47 are converted toward the target color data on the line 6 or 7. Herein, there is shown a case in which the color data 44 is converted toward the target color data 45 located on the line 7 to acquire color data 46 corresponding to the color data 44 after conversion, and also a case in which the color data 47 is converted toward the target color data 48 located on the line 6 to acquire second color data 49 corresponding to the color data 47.

Figure 5:
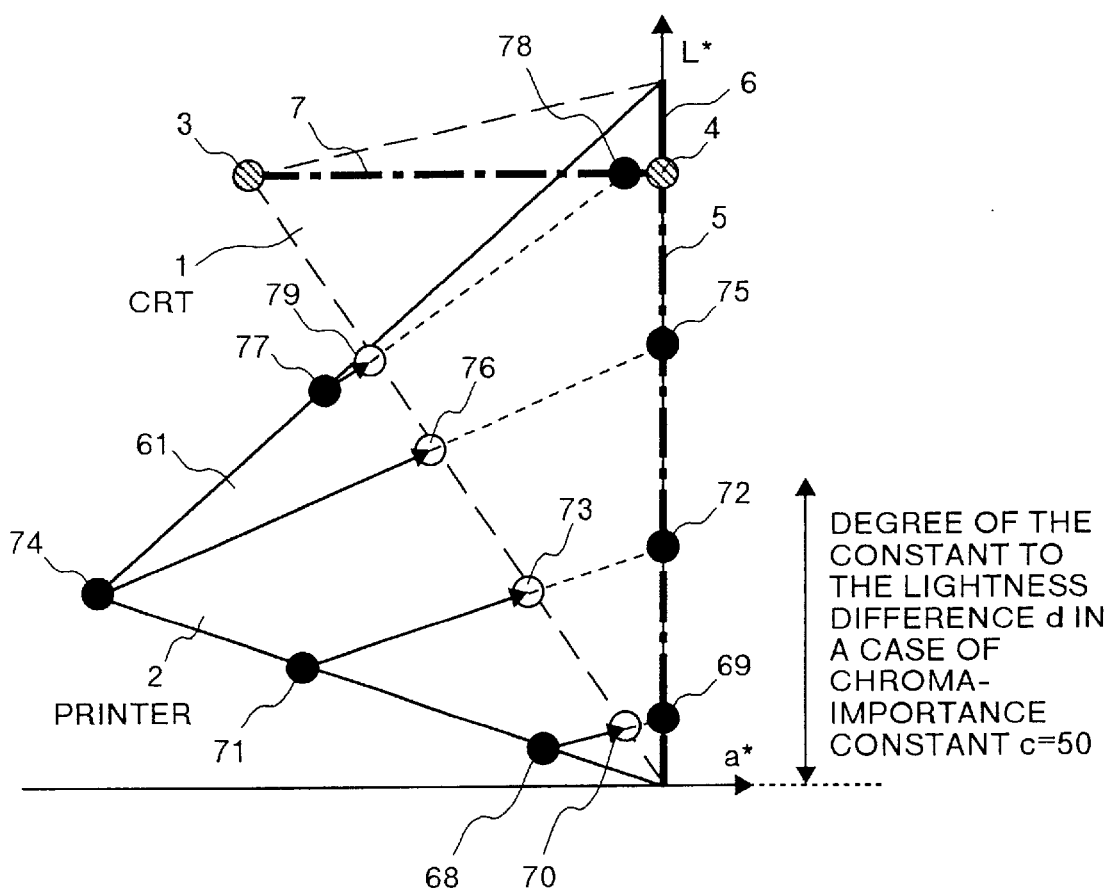
FIG. 5 explains on which line the first color data should be converted toward target color data.

Next, on which line the first color data should be converted toward target color data is explained. FIG. 5 is an explanatory view for explaining on which line the first color data should be converted toward target color data. For convenience in description, at first, description is made for conversion when a result of an image printed by a printer is displayed on a CRT, and the L*a* cross-sectional view is used herein.

In FIG. 5, color data 68, 71, 74, and 77 are first color data included only in the color gamut 1 of a printer, color data 69, 72, and 75 are target color data on a line 5, and color data 78 is target color data on a line 7.

When the color data as a target for conversion has lower lightness than that of the third color data 3 and a difference between the lightness value of the first color data and the lightness value of the third color data 3 is larger than the chroma-importance constant c, then the color data is converted toward the target color data on the line 5.

Precisely, when the first color data has lower lightness than that of the third color data 3, the first color data is converted toward the target color data on the line 5 or 7 as described in FIG. 4, but only with those conditions, it is not uniquely determined on which line of the lines 5 and 7 the color data should be converted toward target color data.

Therefore, when a difference between the lightness value of the first color data and the lightness value of the third color data 3 is larger than the chroma-importance constant c, then the color data is converted toward the target color data on the line 5 as a target for conversion. The reason why it is done like this is, an increase in lightness on data conversion that has been the problem in the conventional technology 3 will not possibly be resolved if the color data on the line 7 is determined as a target for conversion even in the case described above.

For example, each of the first color data 68, 71, and 74 shown in FIG. 5 has lower lightness than that of the third color data 3, and the difference between each of the lightness values of the color data 68, 71, and 74 and the lightness value of the third color data 3 is larger than the chroma-importance constant c, therefore these color data are converted toward target color data 69, 72, and 75 on the line 5 to acquire second color data 70, 73, and 76.

In contrast, when the first color data has lower lightness than that of the third color data 3 and the difference between the lightness value of the first color data and the lightness value of the third color data 3 is smaller than the chroma-importance constant c, the color data is converted toward target color data on the line 7 as a target for conversion.

For example, the color data 77 shown in FIG. 5 has lower lightness than that of the third color data 3, and the difference between the lightness value of the color data 77 and the lightness value of the third color data 3 is smaller than the chroma-importance constant c, therefore the color data 77 is converted toward target color data 78 on the line 7 to acquire second color data 79.

When the first color data has higher lightness than that of the third color data 3 and the difference between the lightness value of the first color data and the lightness value of the third color data 3 is larger than the chroma-importance constant c, the color data is converted toward the target color data on the line 6.

Furthermore, when the first color data has higher lightness than that of the third color data 3 and the difference between the lightness value of the first color data and the lightness value of the third color data 3 is smaller than the chroma-importance constant c, the color data is converted toward the target color data on the line 7.

Figure 6:
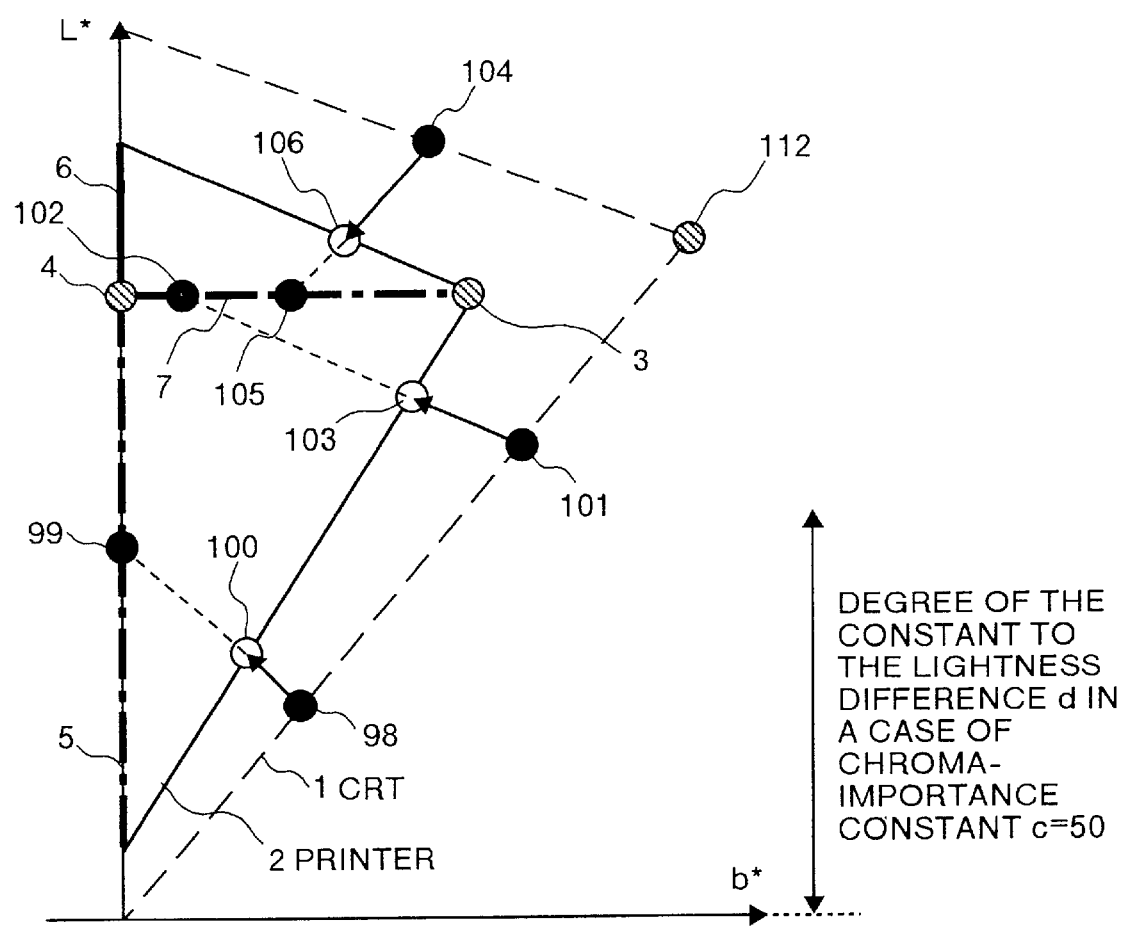
FIG. 6 explains the positions of the target color data on three lines calculated by the target color data calculating section shown in FIG. 3.

Next, description is made for each position of target color data on three lines 5 to 7 calculated by the target color data calculating section 24 shown in FIG. 3. FIG. 6 explains each position of target color data on three lines 5 to 7 calculated by the target color data calculating section 24 shown in FIG. 3. For convenience in description, it is assumed a case where an image displayed on a CRT is printed by a printer, and the L*a* cross-sectional view is used herein.

In FIG. 6, color data 98, 101, and 104 are first color data included in the color gamut 1 of a CRT, and color data 112 is fifth color data which is at the same hue angle as that of those color data and also has the highest chroma included in the color gamut 1 of the CRT.

Then, a chroma proportion between each chroma value of the first color data 98, 101, and 104 and a chroma value of the fifth color data 112 having the highest chroma in the color gamut 1 of the CRT is calculated from the equation as follows:

Chroma proportion=Chroma value of First color data/Chroma value of Fifth color data Also each lightness difference d between each of the first color data 98, 101, and 104 and the color data 3 is calculated from the equation as follows:

Lightness difference $d=|$Lightness value of color data 3−Lightness value of first color data$|$ When the calculated lightness difference d is larger than the chroma-importance constant c, a weight factor is calculated from the equation as follows:

Weight factor=(Lightness difference $d$−Chroma-importance constant $c$)/Chroma-importance constant $c$ On the other hand, when the calculated lightness difference d is smaller than the chroma-importance constant c, a weight factor is calculated from the equation as follows:

Weight factor=Chroma proportion×(Chroma-importance constant $c$−Lightness difference $d$)/Chroma-importance constant $c$ However, when the weight factor is larger than 1, then the weight factor is taken as 1.

Then, when the first color data has lower lightness than that of the third color data 3 and a lightness difference d is smaller than the chroma-importance constant c, and if the weight factor is 0, then the target color data calculating section 24 determines a position of color data 4 on the line 5 as a position of target color data, and moves the target color data closer to the position of a black color in the color gamut 2 of the printer if the weight factor becomes larger. As described above, the reason that the target color data is displaced on the line 7 in association with change of the weight factor is because a change rate in a lightness value as well as in a chroma value of the first color data is reduced to be as small as possible.

For example, when the first color data 98 is to be converted, a chroma-value proportion is computed from the chroma value of the color data 98 and the chroma value of the fifth color data 112, and then a lightness difference d is computed from the lightness value of the color data 98 and the lightness value of the third color data 3. Herein, since the color data 98 has lower lightness than that of the third color data 3 and the lightness difference d is larger than the chroma-importance constant c, a weight factor (d−c)/c is computed, and a position corresponding to the weight factor is determined as a position of target color data 99 shown in FIG. 6. Therefore the color data 98 is converted toward the position of the target color data 99 to acquire second color data 100.

When the first color data has lower lightness than that of the third color data 3 and a lightness difference d is smaller than the chroma-importance constant c, and if the weight factor is 0, the target color data calculating section 24 determines color data 4 on the line 7 as target color data, and approaches the target color data to the position of the third color data 3 if the weight factor becomes larger.

For example, when the first color data 101 is to be converted, a chroma-value proportion is computed from the chroma value of the color data 101 and the chroma value of the fifth color data 112, and then a lightness difference d is computed from the lightness value of the color data 101 and the lightness value of the third color data 3. Herein, since the color data 101 has lower lightness than that of the third color data 3 and the lightness difference d is smaller than the chroma-importance constant c, a weight factor (Chroma proportion×(c−d)/c) is computed, and a position corresponding to the weight factor is determined as a position of target color data 102 shown in FIG. 6. Therefore the color data 101 is converted toward the target color data 102 to acquire second color data 103.

Then, when the first color data has higher lightness than that of the third color data 3 and a lightness difference d is larger than the chroma-importance constant c, and if the weight factor is 0, the target color data calculating section 24 determines a position of target color data 4 on the line 6 as a target for conversion, and moves the target color data closer to the position of a white color in the color gamut 2 of the printer if the weight factor becomes larger.

When the first color data has higher lightness than that of the third color data 3 and a lightness difference d is smaller than the chroma-importance constant c, and if the weight factor is 0, then the target color data calculating section 24 determines target color data 4 on the line 7 as a target for conversion, and moves the target color data closer to the position of the third color data 3 if the weight factor becomes larger.

For example, when the first color data 104 is to be converted, a chroma-value proportion is computed from the chroma value of the color data 104 and the chroma value of the fifth color data 112, and then a lightness difference d is computed from the lightness value of the color data 104 and the lightness value of the third color data 3. Herein, since the color data 104 has higher lightness than that of the third color data 3 and the lightness difference d is smaller than the chroma-importance constant c, a weight factor (Chroma proportion×(c−d)/c) is computed, and a position corresponding to the weight factor is determined as a position of target color data 105 shown in FIG. 6. Therefore the color data 104 is converted toward the target color data 105 to acquire second color data 106.

Figure 7:
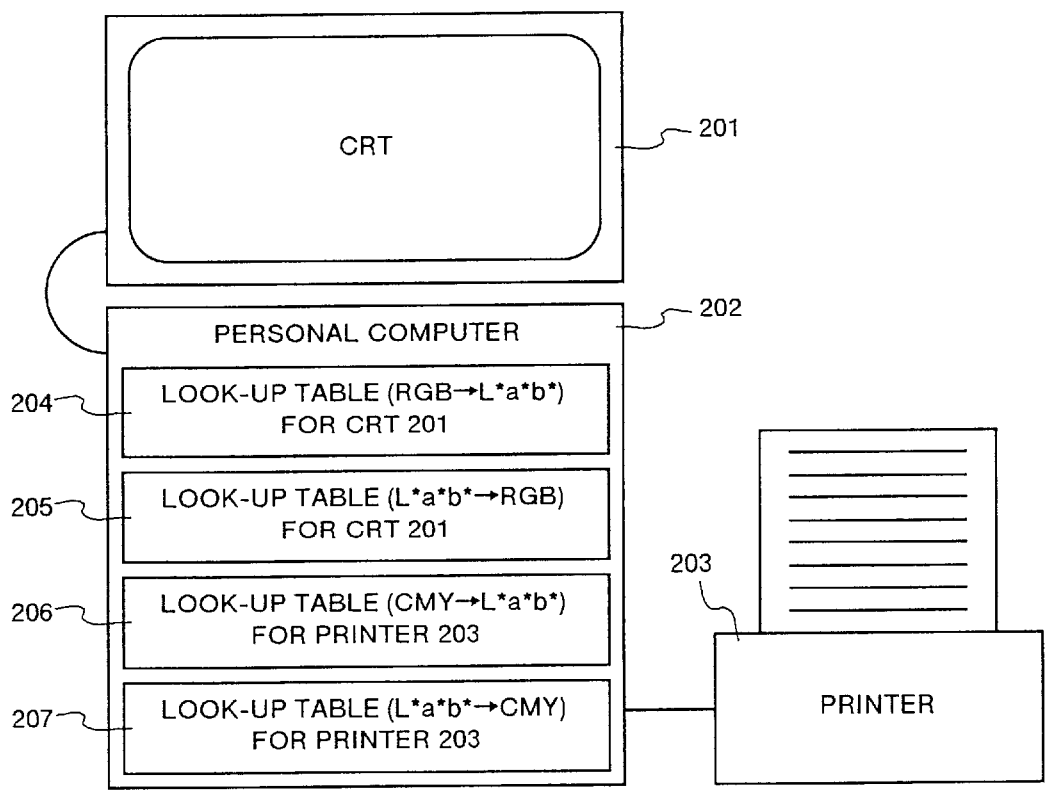
FIG. 7 is a block diagram showing the case where the color data conversion apparatus shown in FIG. 3 is realized on a personal computer.

Next, description is made for the case where the color data conversion apparatus 20 shown in FIG. 3 is realized on a personal computer. FIG. 7 is a block diagram showing the case where the color data conversion apparatus 20 shown in FIG. 3 is realized on a personal computer.

In the figure, a CRT 201 is a display device capable of displaying a color image, a printer 203 is a print device such as a color ink-jet printer capable of printing a color image. It is assumed that a color gamut of the CRT 201 is different from a color gamut of the printer 203.

A personal computer 202 is a computer having general configuration such as a CPU, a memory, a hard disk drive, and a floppy disk drive, and a color image with pixels formed by RGB values is stored in the hard disk or the like. The personal computer 202 executes processing by reading a program executing the processing corresponding to each function section shown in FIG. 3 from the memory or the like by the CPU.

The personal computer 202 sends RGB values of each pixel forming a color image to the CRT 201 as CRT-drive signal and displays the color image on the CRT 201. Furthermore, the personal computer 202 converts pixel values (RGB values) of pixels of a color image to CMY values, generates color-printer control signal with the CMY values, and makes the printer 203 print the color image.

Further, the personal computer 202 stores therein a look-up table (described as "LUT" hereinafter) 204 for converting colors in a RGB color specification system dependent on the CRT 201 to colors in a L*a*b* color specification system, a LUT 205 for converting colors in the L*a*b* color specification system to colors in the RGB color specification system dependent on the CRT 201, a LUT 206 for converting colors in a CMY color specification system dependent on the printer 203 to colors in. the L*a*b* color specification system, and a LUT 207 for converting colors in the L*a*b* color specification system to colors in the CMY color specification system dependent on the printer 203.

More specifically, the LUT 204 is a table correlating RGB values dependent on the CRT 201 to colors (L*a*b* values) displayed when CRT-drive signals corresponding to the RGB values are sent to the CRT 201, and is used for converting RGB values to L*a*b* values.

The LUT 205 is a table correlating colors (L*a*b* values) that an operator wants to display to RGB values for displaying the L*a*b* values, and is used for displaying a color corresponding to some L*a*b* values on the CRT 201. It should be noted that, when a color corresponding to L*a*b* values can not be displayed on the CRT 201, RGB values corresponding to the L*a*b* values are made to be unallocated values. Therefore, the LUT 205 can be used when it is determined whether some L*a*b* values are included in the color gamut of the CRT 201 or not.

Furthermore, the LUT 206 is a table correlating CMY values dependent on the printer 203 to L*a*b* values corresponding to the CMY values, and is used for converting CMY values to L*a*b* values.

The LUT 207 is a table correlating colors (L*a*b* values) that the operator wants to print by the printer 203 to CMY values for printing the L*a*b* values, and is used for printing a color corresponding to some L*a*b* values by the printer 203. It should be noted that, when a color corresponding to L*a*b* values can not be printed by the printer 203, CMY values corresponding to the L*a*b* values are made to be unallocated values. Therefore, the LUT 207 can be used when it is determined whether some L*a*b* values are included in the color gamut of the printer 203 or not.

Figure 8:
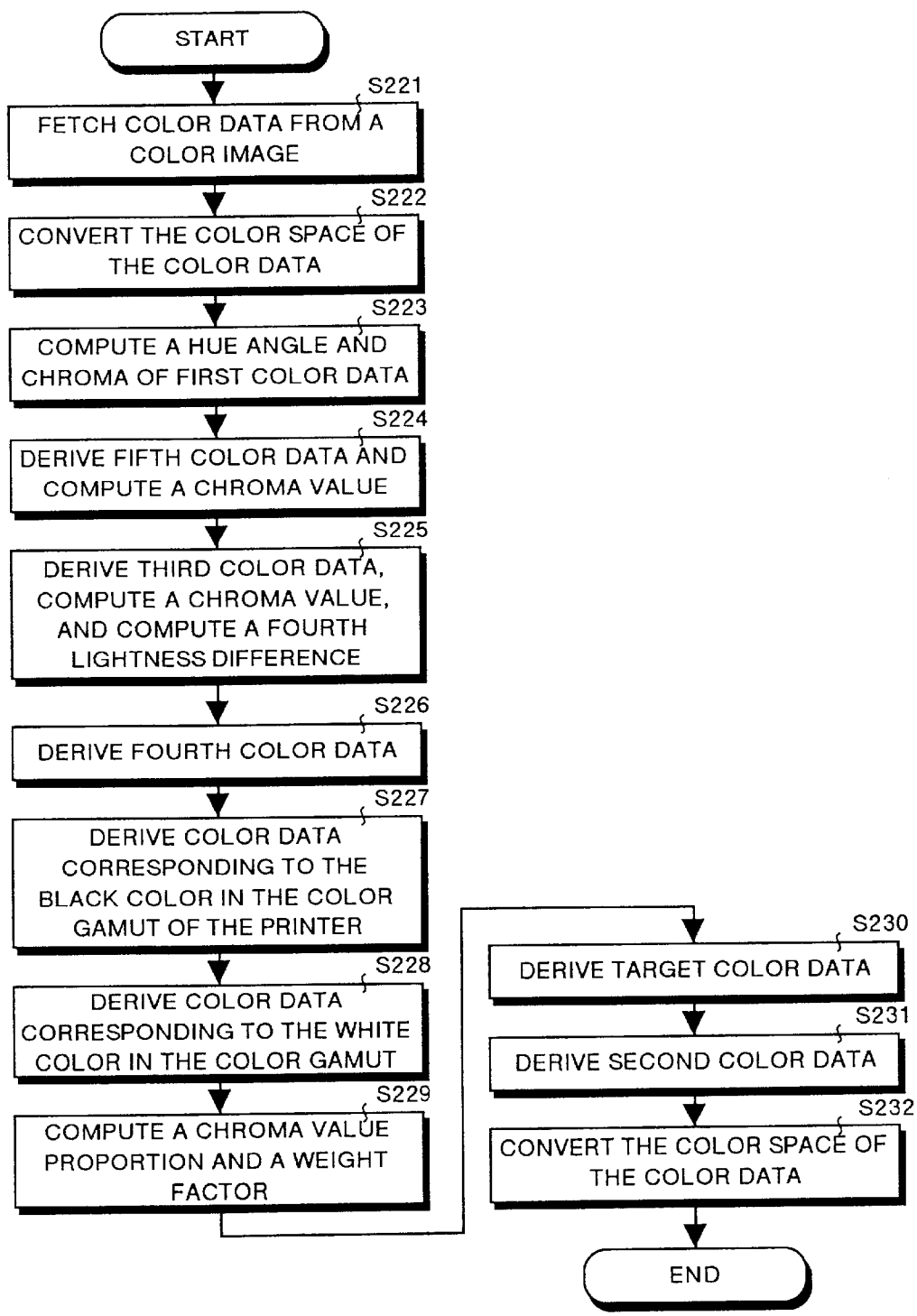
FIG. 8 is a flow chart showing a sequence of conversion of the color data by the personal computer shown in FIG. 7.

Next, description is made for a sequence of converting color data by the personal computer 202 shown in FIG. 7. Herein, a case is explained in which the RGB values are converted to CMY values. FIG. 8 is a flow chart showing a sequence of conversion of color data by the personal computer 202 shown in FIG. 7, and FIG. 9 supports this explanation.

As shown in FIG. 8, the personal computer 202 fetches color data (RGB values) from pixels forming a color image stored in the hard disk or the like not shown herein (step S221). Herein, the RGB values are values for the color space dependent on the CRT 201, and all the values that the RGB values can take form the color gamut 241 of the CRT 201 shown in FIG. 9. The CMY values are values for the color space dependent on the printer 203, and all the values that the CMY values can take form the color gamut 242 of the printer 203 shown in FIG. 9.

Figure 9:
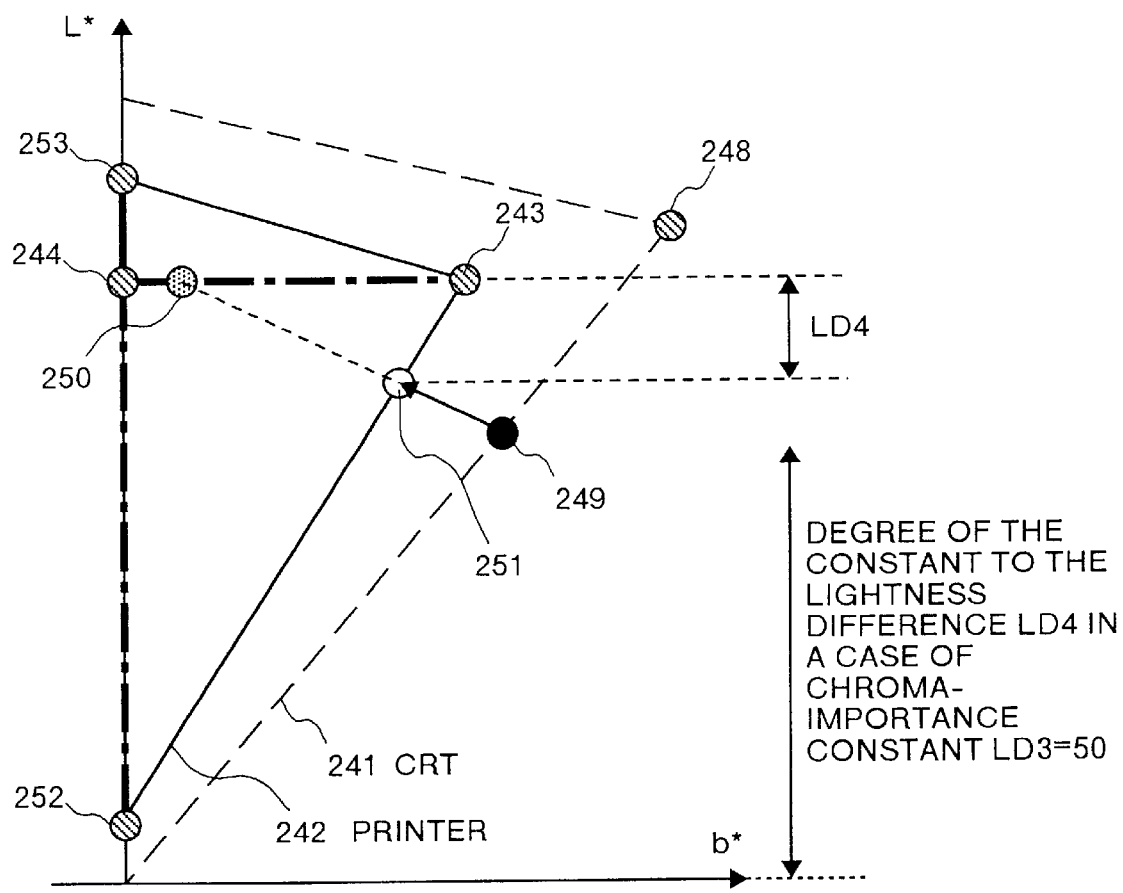
FIG. 9 is an explanatory view for supporting the explanation of the conversion sequence shown in FIG. 8.

The personal computer 202 then converts the RGB values to L*a*b* values which are not dependent on equipment suitable for conversion processing of color data using the LUT 204 (step S222). For example, L*a*b* values of the first color data 249 shown in FIG. 9 are $(L^*_1, a^*_1, b^*_1)$ The personal computer 202 then computes a hue angle value θ representing a hue of the first color data 249 shown in FIG. 9 as well as a chroma value C1 thereof from the equations as follows:

$$\theta = \arctan(b^*_1/a^*_1)$$

$$C1 = \text{SQRT}((a^*_1)^2 + (b^*_1)^2)$$

Where "SQRT (A)" indicates herein the square root of A.

The personal computer 202 then computes fifth color data 248 $(L^*_5, a^*_5, b^*_5)$ having the highest chroma in the color data included in the color gamut 241 of the CRT 201, and computes a chroma value C5 of the fifth color data from the equation as follows (step S224):

$$C5 = \text{SQRT}((a^*_5)^2 + (b^*_5)^2)$$

More specifically, the personal computer 202 determines whether each of all the color data on equal-level hue surfaces represented by the hue angle value θ is included in the color gamut 241 of the CRT 201 or not, and determines the color data having the highest chroma in the color data that has been determined as one included therein as the fifth color data 248. It should be noted that the above mentioned LUT 205 is used when it is determined whether color data is included in the color gamut 241 or not.

The personal computer 202 then computes, on the equal-level hue.surfaces represented by the hue angle value θ, the third color data 243 $(L^*_3, a^*_3, b^*_3)$ having the highest chroma in the color data included in the color gamut 242 of the printer 203, and computes a chroma value C3 thereof and a fourth lightness difference LD4 from the equations as follows (step S225):

$$C3 = \text{SQRT}((a^*_3)^2 + (b^*_3)^2)$$

$$LD4 = |L^*_3 - L^*_1|$$

More specifically, the personal computer 202 determines whether each of all the color data on equal-level hue surfaces represented by the hue angle value θ is included in the color gamut 242 of the printer 203 or not, and determines the color data having the highest chroma in the color data that has been determined as one included therein as the third color data 243. It should be noted that the above mentioned LUT 207 is used when it is determined whether color data is included in the color gamut 242 or not.

The personal computer 202 then computes a fourth color data 244 $(L^*_4, a^*_4, b^*_4)$ for the achromatic color having the same lightness as that of the third color data $(L^*_3, a^*_3, b^*_3)$ from the equations as follows (steps S226):

$$L^*_4 = L^*_3$$

$$a^*_4 = 0$$

$$b^*_4 = 0$$

The personal computer 202 then computes color data 252 $(L^*_k, a^*_k, b^*_k)$ corresponding to the black color in the color gamut 242 of the printer 203. L*a*b* values of the color data 252 are computed by using a LUT 203 as L*a*b* values of a color in which all the C, M, and Y of CMY values are maximum (step S227).

The personal computer 202 then computes color data 253 $(L^*_w, a^*_w, b^*_w)$ corresponding to the white color in the color gamut 242 of the printer 203. L*a*b* values of the color data 253 are derived by using a LUT 203 as L*a*b* values of a color in which all the C, M, and Y of CMY values are minimum (step S228).

The personal computer 202 then performs the calculation described using the chroma-importance constant c. In this embodiment, a case of LD3=50 is explained. At first, the personal computer 202 computes a chroma-value proportion CP from the equation as follows:

$$CP = C1/C5$$

and in a case of LD4≧LD3, a weight factor WT is computed from the equation as follows:

$$WT=(LD4-LD3)/LD3$$

and in a case of LD4<LD3, a weight factor WT is computed from the equation as follows:

$$WT=CP \times (LD3-LD4)/LD3$$

(step S229). However, when WT is greater than 1.0, then WT is taken as 1.0.

The personal computer 202 then computes target color data 250 ($L^*_o$, $a^*_o$, $b^*_o$) by using the already computed weight factor WT, third color data 243 ($L^*_3$, $a^*_3$, $b^*_3$), fourth color data 244 ($L^*_4$, $a^*_4$, $b^*_4$), color data 252 ($L^*_k$, $a^*_k$, $b^*_k$), and color data 253 ($L^*_w$, $a^*_w$, $b^*_w$) (step S230).

More specifically, in order to compute the target color data 250, at first, each value is set to be as follows:

$$L^*_b=L^*_4, a^*_b=a^*_4, b^*_b=b^*_4$$

in a case of $L^*_1 \leq L^*_3$ and LD4≧LD3, each value is set to be as follows:

$$L^*_t=L^*_k, a^*_t=a^*_k, b^*_t=b^*_k$$

in a case of $L^*_1 \leq L^*_3$ and LD4<LD3, each value is set to be as follows:

$$L^*_t=L^*_3, a^*_t=a^*_3, b^*_t=b^*_3$$

in a case of $L^*_1 > L^*_3$ and LD4≧LD3, each value is set to be as follows:

$$L^*_t=L^*_w, a^*_t=a^*_w, b^*_t=b^*_w$$

and, in a case of $L^*_1 > L^*_3$ and LD4<LD3, each value is set to be as follows:

$$L^*_t=L^*_3, a^*_t=a^*_3, b^*_t=b^*_3$$

The target color data ($L^*_o$, $a^*_o$, $b^*_o$) is derived by means of the equations as follows:

$$L^*_o=(L^*_t-L^*_b) \times WT+L^*_b$$
$$a^*_o=(a^*_t-a^*_b) \times WT+a^*_b$$
$$b^*_o=(b^*_t-b^*_b) \times WT+b^*_b$$

By using the equations described above, when first color data has lower lightness than that of the third color data and a fourth lightness difference is larger than a chroma-importance constant c, and if the weight factor is 0, then the personal computer 202 computes the target color data on a position of fourth color data. On the other hand, if the weight factor is larger than 0, then the personal computer 202 computes the target color data on a position moved closer to the color data corresponding to the black color in the color gamut 242 on the first line in accordance with the change in the weight factor.

When first color data has lower lightness than that of the third color data and a fourth lightness difference is smaller than a chroma-importance constant c, and if the weight factor is 0 then the personal computer 202 computes target color data on a position of fourth color data. On the other hand, if the weight factor is larger than 0, then the personal computer 202 computes the target color data on a position moved closer to the third color data on the third line in accordance with the change in the weight factor.

Furthermore, when first color data has higher lightness than that of the third color data and a fourth lightness difference is larger than a chroma-importance constant c, and if the weight factor is 0, then the personal computer 202 computes target color data on a position of fourth color data. On the other hand, if the weight factor is larger than 0, then the personal computer 202 computes the target color data on a position moved closer to the color data corresponding to the white color in the color gamut 242 on the second line in accordance with the change in the weight factor.

When first color data has higher lightness than that of the third color data and a fourth lightness difference is smaller than a chroma-importance constant c, and if the weight factor is 0, then the personal computer 202 computes target color data on a position of fourth color data. On the other hand, if the weight factor is larger than 0, then the personal computer 202 computes the target color data on a position moved closer to the third color data on the third line in accordance with the change in the weight factor.

The personal computer 202 then links first color data to the target color data with a fourth line, and calculates second color data ($L^*_L$, $a^*_L$, $b^*_L$) on the fourth line by using the LUT 207 and the equations as follows:

$$L^*_2=(L^*_o-L^*_1) \times t + L^*_1$$
$$a^*_2=(a^*_o-a^*_1) \times t + a^*_1$$
$$b^*_2=(b^*_o-b^*_1) \times t + b^*_1$$

(step S231). Where t is a factor from 0.0 to 1.0, and is a value computed by means of a sweeping out method or the like so that the second color data ($L^*_2$, $a^*_2$, $b^*_2$) becomes each point of intersection of the fourth line and the outermost line of the color gamut 242 of the printer 203. For example, the first color data 249 shown in FIG. 9 is converted to acquire the second color data 251 shown in the figure.

The personal computer 202 then converts the L*a*b* values ($L^*_2$, $a^*_2$, $b^*_2$) of the second color data to CMY values using the LUT 207 (step S232).

As described above, Embodiment 1 is configured so that the first color data 8, 11, 14, and 17 are converted to second color data by acquiring third color data 3 which is at the same hue angle as that of first color data and also has the highest chroma within a color gamut 2 of a printer as well as fourth color data 4 for an achromatic color having the same lightness as that of the third color data 3 and based on target color data 9, 12, 15, and 18 located at any of the first line 5 linking the acquired fourth color data 4 to color data corresponding to the black color in the color gamut 2 of the printer, on the second line 6 linking the fourth color data 4 to color data corresponding to the white color in the color gamut 2 of the printer, and on the third line 7 linking the fourth color data 4 to the third color data 3, so that when an image fetched through a scanner is to be displayed on a CRT or when a result of an image printed by a printer is to be reproduced on a CRT, color data conversion can efficiently be carried out without increase in its lightness.

By the way, in Embodiment 1 described above, although all of first color data included in a color gamut of a CRT is converted to second color data located on the outermost line of the color gamut of a printer, some of first color data should be converted to second color data locating inside the color gamut of the printer on condition that the first color data is located in an inappropriate position for conversion.

Therefore, in Embodiment 2, description is made for a case where the first color data is converted to second color data on the outermost line of the color gamut of the printer or on any appropriate position inside the color gamut. The basic concepts and the functional block diagram of the color data conversion apparatus in this case are the same as those in Embodiment 1, so that description of overlapping sections therein is omitted and only points different from those in Embodiment 1 will be explained hereinafter.

Figure 10A:
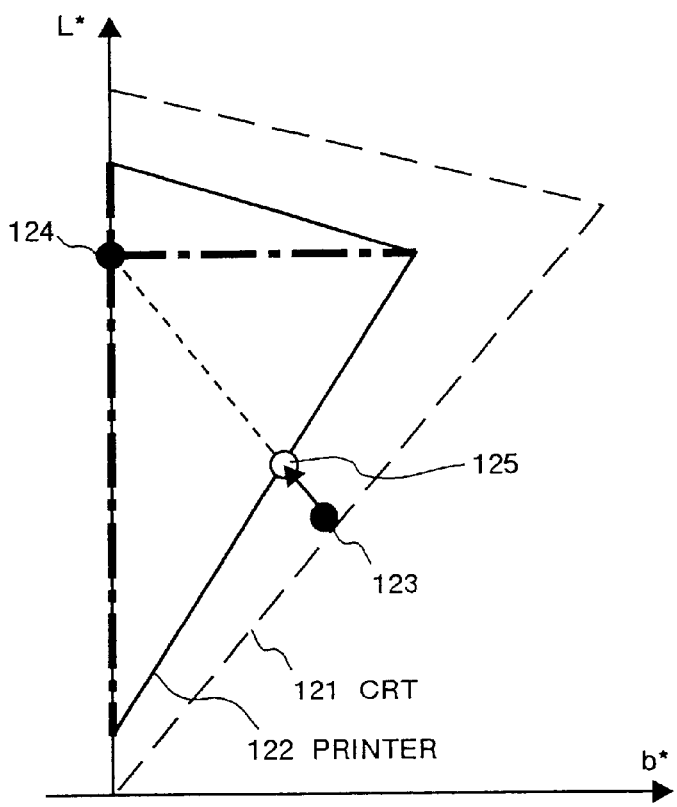
FIGS. 10A and 10B explain the concepts of color data conversion apparatus according to Embodiment 2.
Figure 10B:
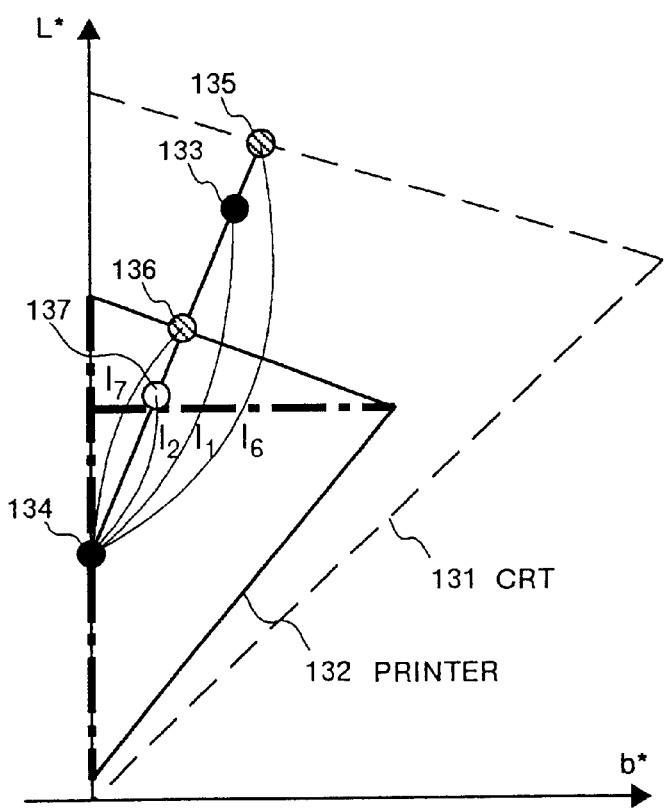

FIGS. 10A and 10B explain the concepts of color data conversion apparatus according to Embodiment 2. As shown in FIG. 10B, in the above mentioned Embodiment 1, when first color data 123 located in the color gamut 121 of a CRT is to be converted to color data in the color gamut 122 of a printer, the first color data 123 is linked to target color data 124 with a fourth line, and color data 125 located at a point of intersection of the fourth line and the outermost line of the color gamut 122 of the printer is determined as second color data.

Therefore, with the above mentioned Embodiment 1, all color data located between the first color data 123 and the second color data 125 is disadvantageously converted to the second color data 125. Each of all the color data located between the first color data 123 and the second color data 125 has different lightness and chroma, so that it is not preferable to convert all of the color data therein to the second color data, thus each position of the second color data should be changed according to the lightness and chroma of each color data.

Because of the reason, in Embodiment 2, when first color data 133 shown in FIG. 10B is to be converted, a position of second color data 137 is determined according to a distance proportion ($l_6$:$l_7$) between a distance $l_6$ from target color data 134 to color data 135 and a distance $l_7$ from the target dolor data 134 to color data 136. Incidentally, reference numeral 131 indicates a color gamut of a CRT and reference numeral 132 indicates a color gamut of a printer.

More specifically, when a distance from the target color data 134 to color data 133 is set to $l_1$ and a distance from the target color data 134 to color data 137 is set to $l_2$, the second color data 137 is computed so as to satisfy the equation as follows:

$$(l_1/l_6)=(l_2/l_7)$$

Figure 11:
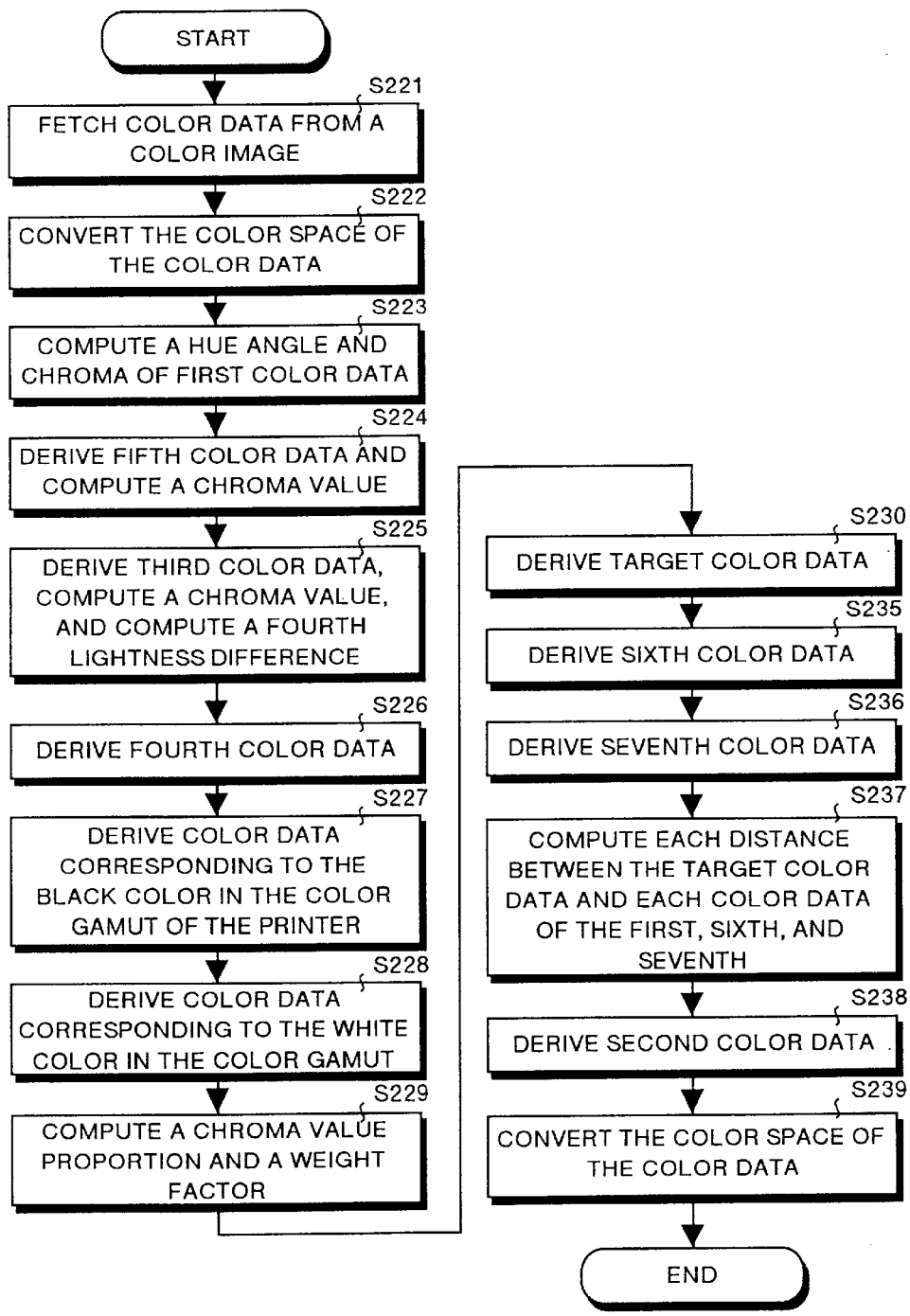
FIG. 11 is a flow chart showing a sequence of conversion of the color data according to Embodiment 2.
Figure 12:
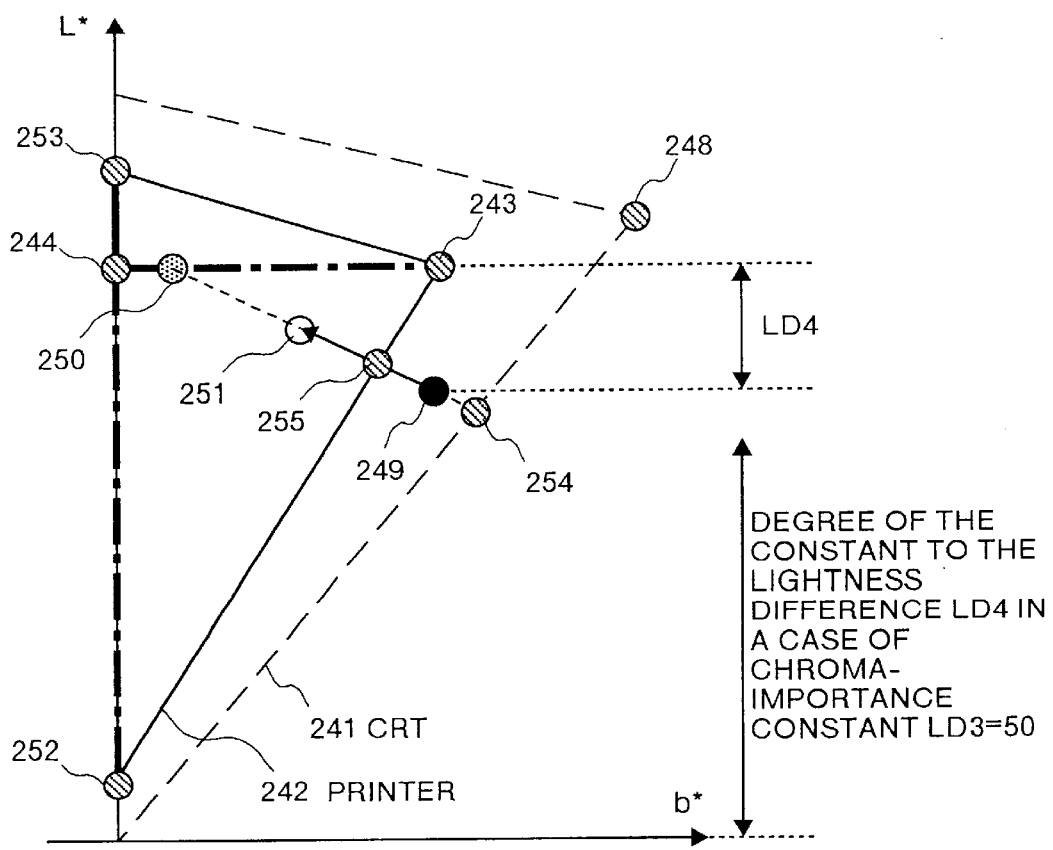
FIG. 12 is an explanatory view for supporting the explanation of the conversion sequence shown in FIG. 11.
Figure 13A:
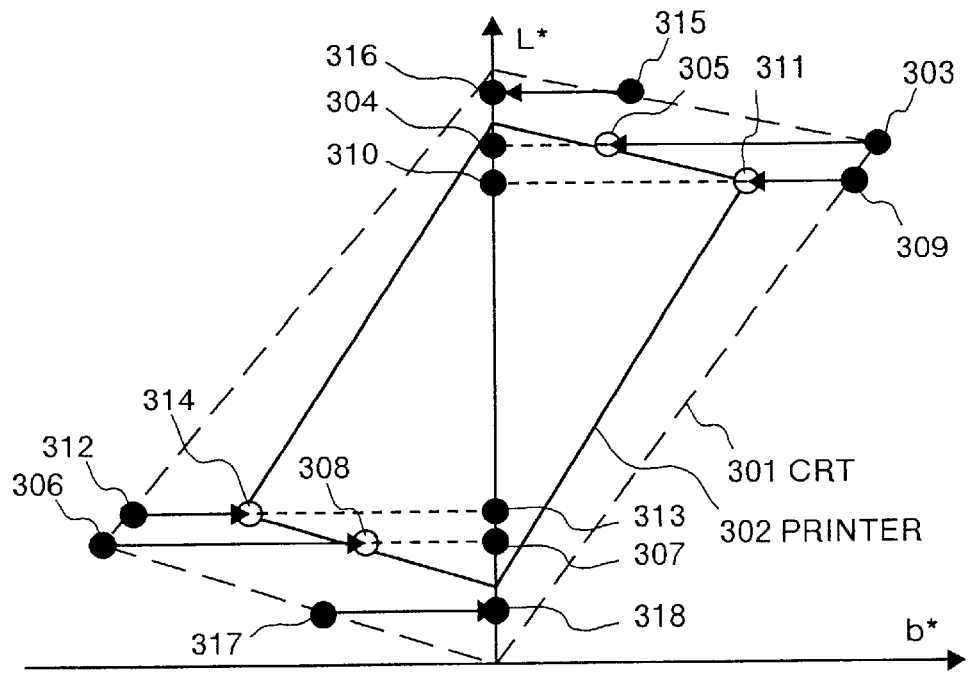
FIGS. 13A and 13B explain the concepts of conventional color data conversion for converting color data included in a color gamut of a CRT to color data included in a color gamut of a printer on a L*a*b* space.
Figure 13B:
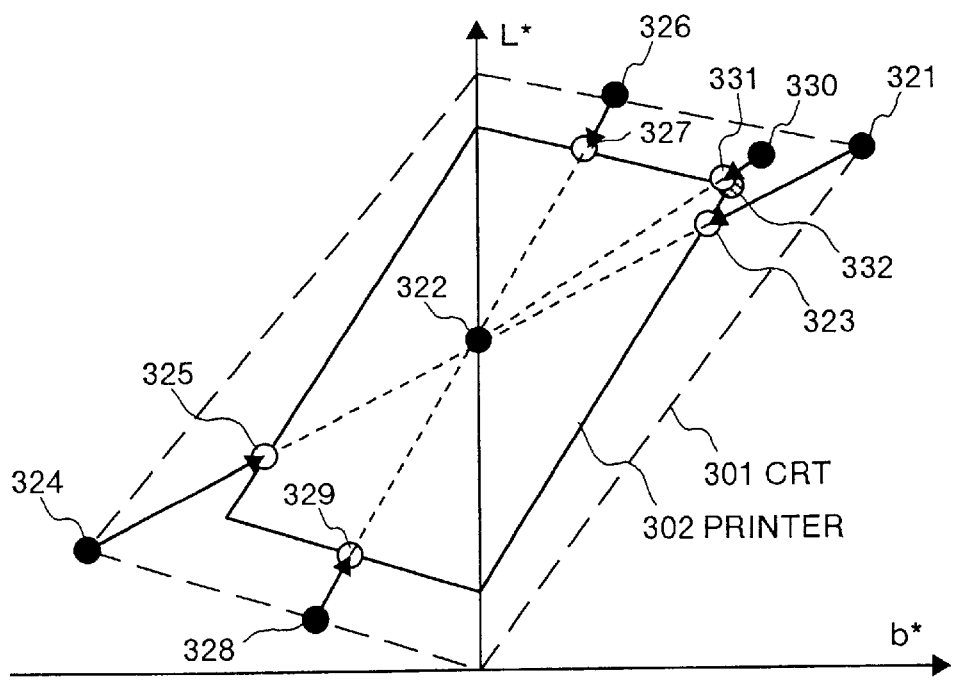
Figure 14A:
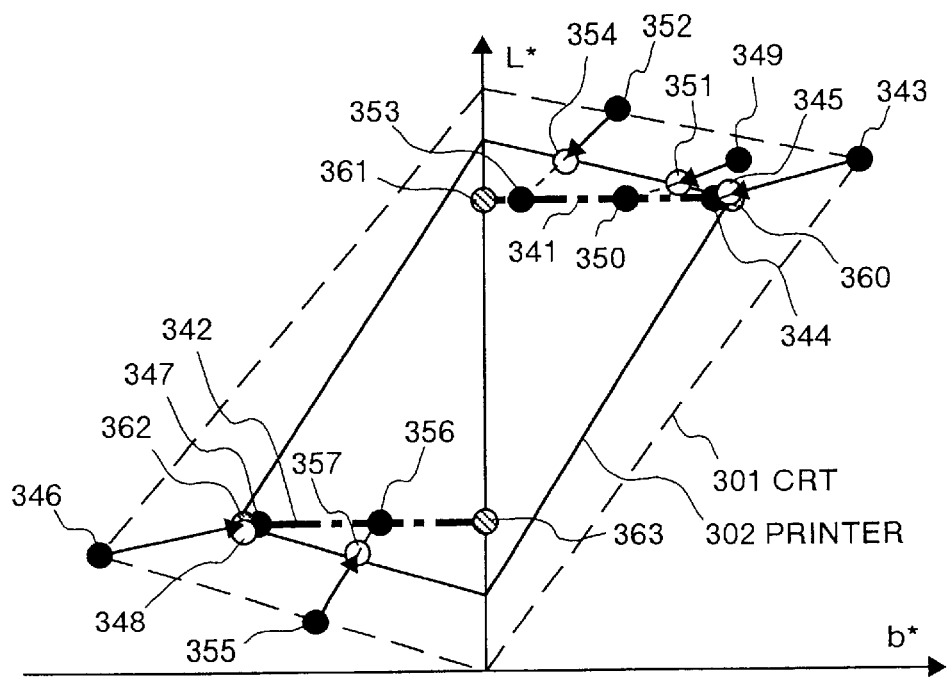
FIGS. 14A and 14B explain the concepts of color data conversion based on the conventional technology 3 and the problems therein.
Figure 14B:
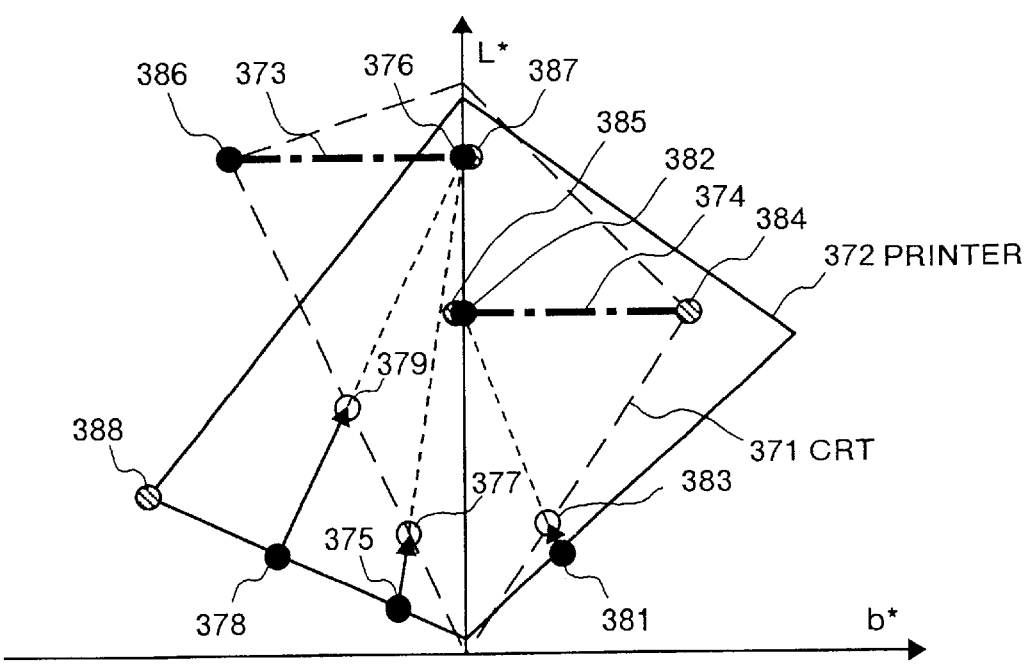

Next, description is made for a sequence of converting color data according to Embodiment 2. FIG. 11 is a flow chart showing a sequence of conversion of color data according to Embodiment 2, and FIG. 12 supports this explanation. The same reference numerals are assigned to steps corresponding to those in the flow chart shown in FIG. 8. As shown in FIG. 12, the processing comprises the steps of, at first, fetching color data (RGB values) from pixels forming a color image stored in a hard disk or the like not shown herein (step S221), converting the RGB values to L*a*b* values not dependent on equipment suitable for conversion processing of color data by using the LUT 204 (step S222), and computing a hue angle value θ representing a hue of the first color data 249 as well as a chroma value C1 thereof (step S223).

After the step, the processing is followed by the steps of deriving fifth color data 248 having the highest chroma in the color data included in the color gamut 241 of the CRT 201 on the equal-level hue surfaces represented by the hue angle value θ, computing a chroma value C5 of the fifth color data (step S224), deriving third color data 243 having the highest chroma in the color data included in the color gamut 242 of the printer 203 on the equal-level hue surfaces represented by the hue angle value θ, and computing a chroma value C3 thereof and a fourth lightness difference D4 (step S225).

After the step, deriving fourth color data 244 for an achromatic color having the same lightness as that of the third color data 243 (step S226), deriving color data 252 corresponding to the black color in the color gamut 242 of the printer 203 (step S227), and driving color data 253 corresponding to the white color therein of the printer 203 (step S228).

Then, computing a chroma value proportion CP and a weight factor WT (step S229), and deriving target color data ($L^*_o$, $a^*_o$, $b^*_o$) 250 by using the already computed weight factor WT, third color data 243, fourth color data 244, color data 252, and color data 253 (step S230).

After the step, linking the first color data to the target color data with a fourth line, and calculating sixth color data ($L^*_6$, $a^*_6$, $b^*_6$) on the fourth line by using the LUT 205 and the equations as follows:

$$L^*_6=(L^*_o-L^*_1)\times t+L^*_1$$

$$a^*_6=(a^*_o-a^*_1)\times t+a^*_1$$

$$b^*_6=(b^*_o-b^*_1)\times t+b^*_1$$

(step S235). The sixth color data ($L^*_6$, $a^*_6$, $b^*_6$) is a point of intersection between the fourth line and the outermost line of the color gamut 241 of the CRT 201 and corresponds to color data 254 shown in FIG. 12.

After the step, the processing is followed by the steps of calculating seventh color data ($L^*_7$, $a^*_7$, $b^*_7$) on the fourth line by using the LUT 207 and the above mentioned equations as well (step S236). The seventh color data ($L^*_7$, $a^*_7$, $b^*_7$) is a point of intersection between the fourth line and the outermost line of the color gamut 242 of the printer 203 and corresponds to color data 255 shown in FIG. 12.

After the step, distances $l_6$ and $l_7$ from the target color data to the above mentioned sixth and seventh color data are computed respectively (step S237). A distance l between the two color data ($L^*_a$, $a^*_a$, $b^*_a$) and ($L^*_b$, $a^*_b$, $b^*_b$) is computed from the equation as follows:

$$l=SQRT\{(L^*_b-L^*_a)^2+(a^*_b-a^*_a)^2+(b^*_b-b^*_a)^2\}$$

After the step, second color data is computed by using the linear equation and the distances $l_6$ and $l_7$ (step S238). A constant t given to the second line is as follows:

$$t=l_6/l_7$$

Then, second color data 251 ($L^*_2$, $a^*_2$, $b^*_2$) is computed by using the constant t and the equations as follows:

$$L^*_L=(L^*_o-L^*_1)\times t+L^*_1$$

$$a^*_L=(a^*_o-a^*_1)\times t+a^*_1$$

$$b^*_L=(b^*_o-b^*_1)\times t+b^*_1$$

After the step, the L*a*b* values ($L^*_2$, $a^*_2$, $b^*_2$) of the second color data are converted to CMY values by using the LUT 207 (step S239).

As described above, Embodiment 2 is configured so that the processing comprises the steps of computing sixth color data located at a point of intersection between the fourth line linking the first color data to the target color data and the outermost line of the color gamut of a CRT as well as seventh color data located at a point of intersection between the fourth line and the outermost line of the color gamut of a printer, and computing a position of second color data according to a distance proportion between a distance from the sixth color data to the target color data and a distance from the seventh color data to the target color data. Therefore, the first color data can be converted to a more appropriated position.

Although there have shown the cases, in Embodiments 1 and 2 described above, where color data within the color gamut of a CRT is converted to color data within the color gamut of a printer, the present invention is not limited to the above embodiments, and is applicable to color data conversion between various types of color image equipment such as a printer, a CRT, and a scanner.

As described above, according to the invention, the configuration has the steps of acquiring third color data which is at the same hue angle as that of first color data and also has the highest chroma within a second color gamut as well as fourth color data for an achromatic color having the same lightness as that of the third color data, and setting target color data on a first line linking the acquired fourth color data to color data corresponding to a black color in the second color gamut, on a second line linking the fourth color data to color data corresponding to a white color in the second color gamut, or on a third line linking the fourth color data to the third color data to convert the first color data to second color data according to the set target color data. Therefore, the first, second, and third lines are insured to be included in the second color gamut, thus the first color data being converted to the second color data without fail.

According to the invention, the configuration has the steps of converting first color data to second color data according to target color data on a first or a third line when the first color data has lower lightness than that of the third color data, and converting first color data to second color data according to target color data on a second or the third line when the first color data has higher lightness than that of the third color data, so that a relation among a lightness value A of the first color data, a lightness value B of the third color data, and a lightness value C of the target color data is always $A>B\leqq C$ or $A<B\geqq C$. Therefore, it is possible to prevent both of the lightness value and chroma value from being reversed.

According to the invention, the configuration has the steps of computing a fourth lightness difference derived from a difference between a lightness value of first color data and a lightness value of third color data, and setting target color data on a first line, on a second line, or on a third line according to the difference between the lightness values of the first color data and second color data as well as the fourth lightness difference. Therefore, it is possible to reduce substantial increase in a lightness value occurring when the first color data for low-lightness green is converted to second color data.

According to the invention, the configuration has the steps of setting target color data on a first line when a lightness value of first color data is lower than a lightness value of third color data and a fourth lightness difference is larger than about 50, setting target color data on a third line when a lightness value of first color data is lower than the lightness value of the third color data and the fourth lightness difference is smaller than about 50, setting target color data on a second line when a lightness value of first color data is higher than the lightness value of the third color data and the fourth lightness difference is larger than about 50, and setting target color data on the third line when a lightness value of first color data is higher than the lightness value of the third color data and the fourth lightness difference is smaller than about 50, so that a line linking the first color data to the target color data has a large angle with respect to the achromatic color axis. Therefore, it is possible to suppress substantial increase in a lightness value occurring when the first color data for green with low lightness is converted to the second color data.

According to the invention, the configuration has the steps of computing a chroma-value proportion obtained by dividing a chroma value of first color data by a chroma value of fifth color data which is at the same hue angle as that of the first color data and also has the highest chroma within a first color gamut, computing a weight factor according to the computed chroma-value proportion as well as to a fourth lightness difference, and computing a position of target color data on a first line, on a second line, or on a third line according to the computed weight factor. Therefore, target color data is located at an appropriated position according to the value of the weight factor, which allows a phenomenon or the like that chroma of yellow having high chroma is largely reduced to be prevented.

According to the invention, the configuration has the steps of determining a value obtained by dividing a value with about 50 subtracted from a fourth lightness difference by about 50 as a weight factor when the fourth lightness difference is larger than about 50, and determining a value, obtained by multiplying the value obtained by dividing the value with the fourth lightness difference subtracted from about 50 by about 50 by a chroma-value proportion, as a weight factor when the fourth lightness difference is smaller than about 50. Therefore, an appropriate weight factor can easily and quickly be computed.

According to the invention, when a lightness value of the first color data is lower than the lightness value of the third color data and the fourth lightness difference is larger than about 50, a position of the fourth color data is determined as a position of the target color data if the weight factor is 0, a position on the first line corresponding to the weight factor is determined as a position of the target color data if the weight factor is not 0; when a lightness value of the first color data is lower than the lightness value of the third color data and the fourth lightness difference is smaller than about 50, a position of the fourth color data is determined as a position of the target color data f the weight factor is 0, a position on the third line corresponding to the weight factor is determined as a position of the target color data if the weight factor is not 0; when a lightness value of the first color data is higher than the lightness value of the third color data and the fourth lightness difference is larger than about 50, a position of the fourth color data is determined as a position of the target color data if the weight factor is 0, a position on the second line corresponding to the weight factor is determined as a position of the target color data if the weight factor is not 0; when a lightness value of the first color data is higher than the lightness value of the third color data and the fourth lightness difference is smaller than about 50, a position of the fourth color data is determined as a position of the target color data if the weight factor is 0, a position on the third line corresponding to the weight factor is determined as a position of the target color data if the weight factor is not 0. Therefore, the target color data can be located at an appropriate position according to the weight factor, and when an image fetched through a scanner is displayed on a CRT or a result of an image printed by a printer is reproduced on a CRT, color data conversion can efficiently be carried out without increase in its lightness.

According to the invention, the configuration has the step of determining color data locating at a point of intersection of a fourth line linking first color data to target color data and the outermost line of a second color gamut as second color data. Therefore, the second color data closest to the first color data can easily and quickly be computed.

According to the invention, the configuration has the steps of computing sixth color data locating at a point of intersection of a fourth line linking first color data to target color data and the outermost line of a first color gamut, and seventh color data locating at a point of intersection of the fourth line and the outermost line of a second color gamut; and computing a position of second color data according to a distance proportion of a distance between the sixth color data and the target color data to a distance between the seventh color data and the target color data. Therefore, all the color data outside the second color gamut is collected to the outermost line of the second color gamut, thus a problem that gray-scale disorder occurs being avoided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A color data conversion apparatus for converting first color data included in a first color gamut, according to prespecified target color data within a second color gamut, to second color data within the second color gamut; said apparatus comprising:

an acquiring unit for acquiring third color data which is at the same hue angle as that of the first color data and also has the highest chroma within the second color gamut as well as fourth color data for an achromatic color having the same lightness as that of the third color data; and a converting unit for setting target color data on a first line linking the fourth color data acquired by said acquiring unit to color data corresponding to a black color in the second color gamut, on a second line linking the fourth color data to color data corresponding to a white color in the second color gamut, or on a third line linking the fourth color data to the third color data, and converting the first color data to the second color data according to the set target color data.

2. The color data conversion apparatus according to claim 1; wherein said converting unit converts the first color data to the second color data according to the target color data on the first or the third line when the first color data has lower lightness than that of the third color data, and converts the first color data to the second color data according to the target color data on the second or the third line when the first color data has higher lightness than that of the third color data.

3. The color data conversion apparatus according to claim 1; wherein said converting unit comprises:

a second computing unit for computing a fourth lightness difference derived from a difference between a lightness value of the first color data and the lightness value of the third color data; and a setting unit for setting the target color data on the first line, on the second line, or on the third line according to the difference between the lightness values of the first color data and the third color data as well as the fourth lightness difference computed by said second computing unit.

4. The color data conversion apparatus according to claim 3; wherein said setting unit sets the target color data on the first line when a lightness value of the first color data is lower than the lightness value of the third color data and the fourth lightness difference is larger than about 50, sets the target color data on the third line when a lightness value of the first color data is lower than the lightness value of the third color data and the fourth lightness difference is smaller than about 50, sets the target color data on the second line when a lightness value of the first color data is higher than the lightness value of the third color data and the fourth lightness difference is larger than about 50, and sets the target color data on the third line when a lightness value of the first color data is higher than the lightness value of the third color data and the fourth lightness difference is smaller than about 50.

5. The color data conversion apparatus according to claim 3; wherein said setting unit comprises:

a chroma-value proportion calculating unit for calculating a chroma-value proportion obtained by dividing a chroma value of the first color data by a chroma value of fifth color data which is at the same hue angle as that of the first color data and also has the highest chroma within the first color gamut;

a weight factor computing unit for computing a weight factor according to the chroma-value proportion calculated by said chroma-value proportion calculating unit as well as to the fourth lightness difference; and a position computing unit for computing a position of the target color data on the first line, on the second line, or on the third line according to the weight factor computed by said weight factor computing unit.

6. The color data conversion apparatus according to claim 5; wherein said weight factor computing unit determines a value obtained by dividing a value with about 50 subtracted from the fourth lightness difference by about 50 as the weight factor when the fourth lightness difference is larger than about 50, and determines a value, obtained by multiplying the value obtained by dividing the value with the fourth lightness difference subtracted from about 50 by about 50 by the chroma-value proportion, as the weight factor when the fourth lightness difference is smaller than about 50.

7. The color data conversion apparatus according to claim 6; wherein said position computing unit, when a lightness value of the first color data is lower than the lightness value of the third color data and the fourth lightness difference is larger than about 50, determines a position of the fourth color data as a position of the target color data if the weight factor is 0, determines a position on the first line corresponding to the weight factor as a position of the target color data if the weight factor is not 0;

when a lightness value of the first color data is lower than the lightness value of the third color data and the fourth lightness difference is smaller than about 50, determines a position of the fourth color data as a position of the target color data if the weight factor is 0, determines a position on the third line corresponding to the weight factor as a position of the target color data if the weight factor is not 0;

when a lightness value of the first color data is higher than the lightness value of the third color data and the fourth lightness difference is larger than about 50, determines a position of the fourth color data as a position of the target color data if the weight factor is 0, determines a position on the second line corresponding to the weight factor as a position of the target color data if the weight factor is not 0;

when a lightness value of the first color data is higher than the lightness value of the third color data and the fourth lightness difference is smaller than about 50, determines a position of the fourth color data as a position of the target color data if the weight factor is 0, determines a position on the third line corresponding to the weight factor as a position of the target color data if the weight factor is not 0.

8. The color data conversion apparatus according to claim 1; wherein said converting unit determines color data located at a point of intersection of a fourth line linking the first color data to the target color data and the outermost line of the second color gamut as the second color data.

9. The color data conversion apparatus according to claim 1; wherein said converting unit computes a sixth color data located at a point of intersection of a fourth line linking the first color data to the target color data and the outermost line of the first color gamut, computes a seventh color data located at a point of intersection of the fourth line and the outermost line of the second color gamut; and computes a position of the second color data according to a distance proportion of a distance between the sixth color data and the target color data to a distance between the seventh color data and the target color data.

10. A color data conversion method for converting first color data included in a first color gamut, according to prespecified target color data within a second color gamut, to second color data within the second color gamut; said method comprising:

an acquiring step of acquiring third color data which is at the same hue angle as that of the first color data and also has the highest chroma within the second color gamut as well as fourth color data for an achromatic color having the same lightness as that of the third color data; and a converting step of setting target color data on a first line linking the fourth color data acquired in said acquiring step to color data corresponding to a black color in the second color gamut, on a second line linking the fourth color data to color data corresponding to a white color in the second color gamut, or on a third line linking the fourth color data to the third color data, and converting the first color data to the second color data according to the set target color data.

11. The color data conversion method according to claim 10; wherein said converting step comprises the steps of converting the first color data to the second color data according to the target color data on the first or the third line when the first color data has lower lightness than that of the third color data, and converting the first color data to the second color data according to the target color data on the second or the third line when the first color data has higher lightness than that of the third color data.

12. The color data conversion method according to claim 10; wherein said converting step comprises:

a second computing step of computing a fourth lightness difference derived from a difference between a lightness value of the first color data and the lightness value of the third color data; and a setting step of setting the target color data on the first line, on the second line, or on the third line according to the difference between the lightness values of the first color data and the third color data as well as the fourth lightness difference computed in said second computing step.

13. The color data conversion method according to claim 12; wherein said setting step comprises the steps of setting the target color data on the first line when a lightness value of the first color data is lower than the lightness value of the third color data and the fourth lightness difference is larger than about 50, setting the target color data on the third line when a lightness value of the first color data is lower than the lightness value of the third color data and the fourth lightness difference is smaller than about 50, setting the target color data on the second line when a lightness value of the first color data is higher than the lightness value of the third color data and the fourth lightness difference is larger than about 50, and setting the target color data on the third line when a lightness value of the first color data is higher than the lightness value of the third color data and the fourth lightness difference is smaller than about 50.

14. The color data conversion method according to claim 12; wherein said setting step comprises:

a chroma-value proportion calculating step of calculating a chroma-value proportion obtained by dividing a chroma value of the first color data by a chroma value of fifth color data which is at the same hue angle as that of the first color data and also has the highest chroma within the first color gamut;

a weight factor computing step of computing a weight factor according to the chroma-value proportion calculated in said chroma-value proportion calculating step as well as to the fourth lightness difference; and a position computing step of computing a position of the target color data on the first line, on the second line, or on the third line according to the weight factor computed in said weight factor computing step.

15. The color data conversion method according to claim 14; wherein said weight factor computing step comprises the steps of determining a value obtained by dividing a value with about 50 subtracted from the fourth lightness difference by about 50 as the weight factor when the fourth lightness difference is larger than about 50, and determining a value, obtained by multiplying a value obtained by dividing the value with the fourth lightness difference subtracted from about 50 by about 50 by the chroma-value proportion, as the weight factor when the fourth lightness difference is smaller than about 50.

16. The color data conversion method according to claim 15; wherein in said position computing step, when a lightness value of the first color data is lower than the lightness value of the third color data and the fourth lightness difference is larger than about 50, a position of the fourth color data is determined as a position of the target color data if the weight factor is 0, a position on the first line corresponding to the weight factor is determined as a position of the target color data if the weight factor is not 0;

when a lightness value of the first color data is lower than the lightness value of the third color data and the fourth lightness difference is smaller than about 50, a position of the fourth color data is determined as a position of the target color data if the weight factor is 0, a position on the third line corresponding to the weight factor is determined as a position of the target color data if the weight factor is not 0;

when a lightness value of the first color data is higher than the lightness value of the third color data and the fourth lightness difference is larger than about 50, a position of the fourth color data is determined as a position of the target color data if the weight factor is 0, a position on the second line corresponding to the weight factor is determined as a position of the target color data if the weight factor is not 0;

when a lightness value of the first color data is higher than the lightness value of the third color data and the fourth lightness difference is smaller than about 50, a position of the fourth color data is determined as a position of the target color data if the weight factor is 0, a position on the third line corresponding to the weight factor is determined as a position of the target color data if the weight factor is not 0.

17. The color data conversion method according to claim 10; wherein said converting step comprises the step of determining color data located at a point of intersection of a fourth line linking the first color data to the target color data and the outermost line of the second color gamut as the second color data.

18. The color data conversion method according to claim 10; wherein said converting step comprises the steps of computing a sixth color data located at a point of intersection of a fourth line linking the first color data to the target color data and the outermost line of the first color gamut as well as a seventh color data located at a point of intersection of the fourth line and the outermost line of the second color gamut; and computing a position of the second color data according to a distance proportion of a distance between the sixth color data and the target color data to a distance between the seventh color data and the target color data.

19. A computer-readable recording medium with a program making a computer execute the color data conversion method for converting first color data included in a first color gamut, according to prespecified target color data within a second color gamut, to second color data within the second color gamut recorded therein; said medium recording therein a program for making a computer execute the sequence of:

an acquiring step of acquiring third color data which is at the same hue angle as that of the first color data and has the highest chroma within the second color gamut as well as fourth color data for an achromatic color having the same lightness as that of the third color data; and a converting step of setting target color data on a first line linking the fourth color data acquired in said acquiring step to color data corresponding to a black color in the second color gamut, on a second line linking the fourth color data to color data corresponding to a white color in the second color gamut, or on a third line linking the fourth color data to the third color data, and converting the first color data to the second color data according to the set target color data.

\* \* \* \* \*